(12) United States Patent
Kim et al.

(10) Patent No.: US 11,142,698 B2
(45) Date of Patent: Oct. 12, 2021

(54) STORAGE STABLE LIQUID FUGITIVE COLORED FIRE-RETARDANT CONCENTRATES

(71) Applicant: Perimeter Solutions LP, Clayton, MO (US)

(72) Inventors: Melissa Kim, Alta Loma, CA (US); Marcela Muñoz, Fontana, CA (US); Howard L. Vandersall, Upland, CA (US); Juan Robles, Highland, CA (US)

( * ) Notice: Subject to any disclaimer, the term of this patent is extended or adjusted under 35 U.S.C. 154(b) by 67 days.

(21) Appl. No.: 16/441,241

(22) Filed: Jun. 14, 2019

(65) Prior Publication Data
US 2019/0382661 A1 Dec. 19, 2019

Related U.S. Application Data

(60) Provisional application No. 62/685,654, filed on Jun. 15, 2018.

(51) Int. Cl.
| | | |
|---|---|---|
| C09K 21/04 | (2006.01) | |
| C09K 11/02 | (2006.01) | |
| C05B 7/00 | (2006.01) | |
| C05G 5/23 | (2020.01) | |
| C09B 67/00 | (2006.01) | |

(52) U.S. Cl.
CPC ............... C09K 21/04 (2013.01); C05B 7/00 (2013.01); C05G 5/23 (2020.02); C09B 68/41 (2013.01); C09K 11/025 (2013.01)

(58) Field of Classification Search
CPC ........ C09K 21/04; C09K 11/025; C05G 5/23; C05B 7/00; C09B 68/41
See application file for complete search history.

(56) References Cited

U.S. PATENT DOCUMENTS

| | | |
|---|---|---|
| 5,439,968 A | 8/1995 | Hyche |
| 6,162,375 A | 12/2000 | Crouch et al. |
| 6,395,200 B2 * | 5/2002 | Crouch ................ A62D 1/0014 252/601 |
| 6,447,697 B1 | 9/2002 | Vandersall |
| 6,780,991 B2 | 8/2004 | Vandersall et al. |
| 6,828,437 B2 | 12/2004 | Vandersall et al. |
| 8,202,449 B2 | 6/2012 | Garner et al. |
| 2018/0037998 A1 * | 2/2018 | Khosla ................ C23F 11/167 |

OTHER PUBLICATIONS

United States Department of Agriculture Forest Service, Specification for Long Term Retardant, Wildland Firefighting, Specification 5100-304c, Amendment No. 3, May 17, 2010, 2 pages.
122-9180 Rocket Red Pigment, Material Safety Data Sheet (MSDS), Revision Date Jan. 12, 2007, 6 pages.
122-9180 Rocket Red Pigment, Material Safety Data Sheet (MSDS), Revision Date Jul. 6, 2004, 6 pages.

* cited by examiner

*Primary Examiner* — Amina S Khan
(74) *Attorney, Agent, or Firm* — Stinson LLP

(57) ABSTRACT

This disclosure relates to fugitive color systems and storage-stable fugitive colored liquid long-term fire retardant compositions comprising a fugitive color system. The fugitive color system comprises a fugitive color pigment. In particular, disclosed herein is the identification of fugitive color pigments exhibiting hydrophilic or diminished hydrophobic tendencies. And, in certain aspects, the fugitive color pigment is fluorescent.

16 Claims, 7 Drawing Sheets

STORAGE STABLE LIQUID FUGITIVE COLORED FIRE-RETARDANT CONCENTRATES

CROSS-REFERENCE TO RELATED APPLICATIONS

This application claims the benefit of U.S. Provisional Patent Application Ser. No. 62/685,654, filed Jun. 15, 2018, the entire contents of which are hereby incorporated by reference for all relevant purposes.

FIELD OF THE INVENTION

This disclosure relates to fugitive color systems and storage-stable fugitive colored liquid long-term fire retardant compositions comprising a fugitive color system. The fugitive color system comprises a fugitive color pigment. In particular, disclosed herein is the identification of fugitive color pigments exhibiting hydrophilic or diminished hydrophobic tendencies. And, in certain aspects, the fugitive color pigment is fluorescent.

BACKGROUND

Long-term fire retardants used for the suppression, containment, and control of wildland fire consist of an aqueous, thickened, corrosion-inhibited, ammonium phosphate solution, colored for visibility and optionally containing other functional components. The retardant solution is thickened with a water-soluble polymer to improve application characteristics and colored so that it is visible at the time of application. Most long-term retardant solution is applied aerially from fixed-wing aircraft or helicopters although ground tankers or engines can, and are, being used to apply it as well. The composition and characteristics of long-term retardants currently are formulated to meet the requirements of U.S.D.A., Forest Service Specification 5100-304c, which is incorporated by reference herein in its entirety.

Long-term fire retardant solutions are most effective when applied, at an optimum application rate, dependent on fuel loading, fire intensity and weather, in front of the advancing flame front, allowing the fire to penetrate the line of retardant solution coated fuel. Retardant visibility makes it possible to assure that the application of retardant solution on the fuel is continuous and at a rate consistent with the fuel loading and fire intensity. When the retardant is applied at an effective rate and over a wide enough area so that burning brands are not blown beyond the retardant line, the flame length and rate of flame spread decreases as the flame front advances into the treated fuel allowing ground forces to better gain control of the situation.

In practice, a retardant concentrate is delivered to a fire facility where it is stored and mixed or blended with water prior to actual use. In most cases the fire facility is located at an airport capable of servicing fixed wing aircraft of the type used to transport and deliver long-term fire retardant to an out-of-control fire. In other cases, the retardant concentrate is delivered to mobile and portable equipment located near an out-of-control fire. This mobile or portable equipment is capable of servicing either fixed wing (airplanes) or rotor-wing aircraft (helicopters) that are capable of delivering long-term fire retardant solution to the fire. As delivered to the Agency with responsibility for wildland fire control, the retardant concentrate can be a dry powder or a concentrated liquid. If the retardant is delivered as a dry-powder it must be mixed with water at a prescribed weight per unit volume of water to prepare a retardant solution that is subsequently stored until pumped into a transport and/or application vehicle (ground tankers or engines, helicopters or fixed wing aircraft). When the fire retardant is delivered to the storage facility as a concentrated liquid, the concentrate is transferred from the delivery vehicle and stored without dilution. When fire retardant use is contemplated, the liquid fire retardant concentrate is diluted with water, at the prescribed volume per unit volume, inline during transfer directly to the transport and application vehicle.

Tanks capable of containing either the long-term fire retardant solution or the liquid fire retardant concentrate are maintained on site for storing large volumes, generally thousands of gallons, of the retardant concentrate or solution. In either case, the liquid Concentrate and the retardant solution is expected to remain homogeneous, or capable of being easily and rapidly re-homogenized before discharge, dilution and application.

During the early 1980s, red scars left on the landscape by persistent red iron oxide pigment that was used to color wildland fire retardants became an aesthetic concern. Because of this concern, fire retardant solution was sometime not used, although desperately needed, to gain control of wildland fire in scenic areas. This led to Agency request for a fugitive color pigment that was visible at the time of application and for a few days thereafter, but then faded becoming less visible with time. The rate of fade of a fugitive pigment is dependent on the ultraviolet light intensity and duration in natural sunlight exposure. The fugitive color-pigment can be manufactured by admixing a suitable quantity of ultraviolet sensitive dye with a suitable monomer prior to polymerization. The colored polymer is then milled to a very fine powder, e.g. less than about 10-microns. The chosen dye within the transparent polymer provides a hue that is vivid and contrasts with the natural colors of wildland fuels sufficiently so that it is visible to the human eye during fire retardant application on the fire during the fire prone seasons of the year. Since the red color of iron oxide was considered most visible when applied within the wide range of colors commonly found in the wildland fire environment, an International orange-red was initially chosen for the fugitive pigment. The amount of color pigment present in the retardant solution is relatively small, i.e., generally less than 0.5%.

Fugitive colored retardant solutions are the product of choice in areas where aerially delivered retardant applications remain visible to the general public long after containment of the fire and, consequently, result in perceived aesthetic and environmental issues. Iron-oxide-colored retardants continue to be used in wilderness and other remote areas of the United States, Canada and other countries where visual aesthetics are not presently a concern. Long-term retardants are colored so that aerial observers and ground troops can visually tell the difference between retardant treated fuels and untreated fuels. This is necessary to assure that gaps in retardant treated lines or areas that would allow fire to circumvent or penetrate through the retardant line, can be seen and can be repaired. It should be noted that fire-retardant solutions can result in some discoloration after the fugitive pigment has totally faded while opacifiers remain. This permissible level of discoloration cannot, however, be noticed visually from a distance.

Fugitive-colored retardants are more difficult to see than iron oxide colored retardants in some fuel types and colors. Therefore, fugitive-colored retardant solutions that are easier to see in all fuel types are needed. In addition, the polymer surface of current fugitive color pigments is an organic polymer that exhibits a level of hydrophobia, i.e., during manufacture of the fire retardant concentrate, the current fugitive pigments are very difficult to wet and homogenize within aqueous media. Further, the current fugitive colored pigments tend to form a matte of considerable thickness during static storage. This matte clings to tank walls during static storage and even during recirculation. The matte is an indication of concentrate instability, i.e., non-homogeneity.

When a fire emergency occurs and an application vehicle is in the pit, on-site personnel immediately begin retardant concentrate discharge from the bottom of the storage tank through a dilution system designed to provide the correct ratio of retardant concentrate and water and directly inline to the transfer and application vehicle. Generally, loading of the application vehicle is completed within 10 to 15-minutes and the vehicle is dispatched with the same haste as with any other emergency equipment. Therefore, it is essential that the concentrated liquid be homogenous (stable) or capable of being homogenized within a very few minutes.

SUMMARY

Provided for herein is a fugitive color system comprising a fugitive pigment and a water insoluble opaque material, wherein the fugitive pigment comprises a dye encapsulated within a polymeric material. In certain aspects, the fugitive pigment exhibits hydrophilic behavior or reduced hydrophobic properties. In certain aspects, the fugitive pigment is hydrophilic. In certain aspects, the dye is a fluorescent dye and the fugitive pigment is a fluorescent fugitive pigment. In certain aspects, the fugitive pigment is a fluorescent magenta in color. In certain aspects, the fugitive pigment has a Lab color spacing of "L" in a range from about 34 to about 89, "a" in a range from about 18 to about 83, and "b" in a range from about −61 to about 56. In certain aspects, the water insoluble opaque material comprises a finely divided iron oxide pigment, zinc ferrite, tri-calcium phosphate, barium phosphate, or titanium dioxide. In certain aspects, the water insoluble opaque material comprises a finely divided iron oxide pigment.

In certain aspects of a fugitive color system disclosed herein, the fugitive pigment of the fugitive color system has at least one property selected from the list consisting of: (i) a 0.5% (w/w) suspension of the fluorescent fugitive pigment in distilled $H_2O$ has a pH of about pH 4 to pH 7 (e.g., pH about 5.6); (ii) the fugitive pigment has a softening point of ≥60° C. (e.g., about 134° C.); (iii) the fugitive pigment has a melting range of ≥130° C. (e.g., about 145° C. to about 150° C.); (iv) the fugitive pigment has a particle density of about 1.2 g/ml to about 1.5 g/ml (e.g., about 1.2 g/ml); (v) the fugitive pigment has an apparent bulk density of about 0.25 g/ml to about 0.37 g/ml (e.g., about 0.37 g/ml); (vi) the fugitive pigment exhibits oil absorption of about 55 g/100 g to about 80 g/100 g (e.g., about 80 g/100 g pigment); and (vii) the fugitive pigment has a mean particle size of about 4.5 μm to about 5.0 μm. In certain aspects, the fugitive pigment of the fugitive color system has two, three, four, five, six, or seven of above properties (i), (ii), (iii), (iv), (v), (vi), or (vii). In certain aspects, the fugitive pigment has a surface free energy of about 33, 35, 40, 45, 48.8, 50, 55, 58.8, 60, 70, 80, 85, or 90 mN/m, or any range in between. In certain aspects, the fugitive pigment has a polar component value of about 5, 6, 7, 8, 10, 12, 15, 20, 20.9, 25, 26.5, 30, 40, 50, or any range in between. In certain aspects, the fugitive pigment is easy to incorporate into aqueous media. In certain aspects, the fugitive pigment incorporates more quickly into an aqueous media than a control fugitive pigment that does not exhibit hydrophilic behavior and/or is not hydrophilic. In certain aspects, a dry-powder component for use in a liquid fire-retardant concentrate comprises a fugitive color system and the dry-powder component has a surface free energy of about 33, 35, 40, 45, 48.8, 50, 55, 58.8, 60, 70, 80, 85, or 90 mN/m, or any range in between. In certain aspects, a dry-powder component for use in a liquid fire-retardant concentrate comprises a fugitive color system and the dry-powder component has a polar component value of about 5, 6, 7, 8, 10, 12, 15, 20, 20.9, 25, 26.5, 30, 40, 50, or any range in between. Certain aspects provide for a dry-powder component comprising a fugitive color system as described herein. In certain aspects, the dry-powder component is easy to incorporate into aqueous media. In certain aspects, the dry-powder incorporates more quickly into an aqueous media than a control dry-powder component.

Certain aspects provide or a liquid fire-retardant concentrate comprising a fugitive color system as described herein, suspended in a liquid fire-retardant component. Certain aspects provide a liquid fire-retardant concentrate comprising a dry-powder component as described herein, suspended in a liquid fire-retardant component. In certain aspects, the fugitive color system and/or dry-powder component is in an amount of about 1.0% to about 1.5% (w/w) of the fire-retardant concentrate. In certain aspects, the liquid fire-retardant component is selected from the group consisting of an ammonium phosphate solution, an ammonium sulfate solution, an ammonium thiosulfate solution, and mixtures thereof. In certain aspects, the liquid fire-retardant component is an ammonium phosphate solution. In certain aspects, the liquid fire-retardant component is a 10-34-0 agricultural fertilizer solution. In certain aspects, the liquid fire-retardant component is an 11-37-0 agricultural fertilizer solution. In certain aspects, the liquid fire-retardant concentrate also comprises one or more of: a suspending clay; a corrosion inhibiting system; or a biopolymer, suspended in the liquid fire-retardant component. In certain aspects, the fugitive color system, fugitive pigment, and/or the dry-powder component is capable of stabilizing the fire-retardant concentrate. In certain aspects, the fugitive color system, fugitive pigment, and/or the dry-powder component stabilizes the fire-retardant concentrate. In certain aspects, the fire-retardant concentrate exhibits compositional stability throughout. In certain aspects, the fire-retardant concentrate is more stable than a control fire-retardant concentrate that is identical in composition except for not containing a fugitive pigment exhibiting hydrophilic behavior and/or a hydrophilic fugitive pigment.

Certain aspects provide for a method of producing a liquid fire-retardant concentrate. In certain aspects, the method comprises mixing a premix component comprising a fugitive color system disclosed herein and/or the dry-powder component disclosed herein with a liquid fire-retardant component. In certain aspects, the liquid fire-retardant component is selected from the group consisting of an ammonium phosphate solution, an ammonium sulfate solution, an ammonium thiosulfate solution, and mixtures thereof. In certain aspects, the liquid fire-retardant component is an ammonium phosphate solution such as 10-34-0 or 11-37-0. In certain aspects, the premix further comprises one or more of a suspending clay, a corrosion inhibiting system, and/or a biopolymer.

Certain aspects provide for a method of producing a fire-retardant solution. In certain aspects, the method comprises diluting a liquid fire-retardant concentrate disclosed herein with water. In certain aspects, the liquid fire-retardant concentrate is diluted with water at the concentrate:water ratio required to provide minimum acceptable fire-retardation performance as defined by U.S.D.A. Forest Service Specification 5100-304c. Certain aspects provide for a fire-retardant solution, wherein the solution is produced by diluting a liquid fire-retardant concentrate disclosed herein with water. In certain aspects, a fire-retardant solution comprises a liquid fire-retardant concentrate disclosed herein diluted in water. In certain aspects of a fire-retardant solution, the fugitive pigment of the fugitive color system and/or dry powder component of the fire-retardant concentrate is capable of stabilizing the solution. In certain aspects, the fugitive pigment of the fugitive color system and/or dry powder component of the fire-retardant concentrate stabilizes the solution. In certain aspects, the fire-retardant solution is more stable than a control fire-retardant solution that is identical in composition except for not containing a fugitive pigment exhibiting hydrophilic behavior and/or a hydrophilic fugitive pigment.

Also provided for herein is a method of preparing a fire retardant composition adapted for aerial application to wildland fuels and wildland fires, the method comprising the steps of: (a) forming an intermediate storage-stable liquid concentrate composition comprising at least (i) a liquid fire retardant comprised of at least one ammonium polyphosphate, (ii) a fugitive pigment exhibiting hydrophilic behavior and/or that is a hydrophilic fugitive pigment, (iii) and optionally other functional components, (b) dilution of the liquid composition with water to form a fire-retardant solution exhibiting a minimum standard of fire-retardantcy, (c) applying the fire-retardant solution on wildland fuels threatened by fire or (d) on the periphery of the fuel:fire interface, resulting in a reduction in fire intensity.

Also provided for herein is a storage-stable liquid fire-retardant solution obtained by diluting any one of the liquid fire-retardant concentrates as described herein with water at a ratio of 5.5 volumes of water per 1.0 volume of the liquid fire-retardant concentrate.

Certain aspects provide for a fugitive color system comprising a fugitive pigment and a water insoluble opaque material, wherein the fugitive pigment comprises a dye encapsulated within a polymeric material and wherein the fugitive pigment is a fugitive pigment as described anywhere herein and has a surface free energy of about or greater than about 33, 35, 40, 45, 48.8, 50, 55, 58.8, 60, 70, 80, 85, or 90 mN/m, or any range in between.

A fugitive color system comprising a fugitive pigment and a water insoluble opaque material, wherein the fugitive pigment comprises a dye encapsulated within a polymeric material and wherein the fugitive pigment is a fugitive pigment as described anywhere herein and has a polar component value of about or greater than about 5, 6, 7, 8, 10, 12, 15, 20, 20.9, 25, 26.5, 30, 40, 50, or any range in between.

BRIEF DESCRIPTION OF THE DRAWINGS/FIGURES

Figure 7:

FIG. 7 pictorially shows the stability of fire-retardant solutions prepared with Concentrate 1 (left) and Concentrate 2 (right).

DETAILED DESCRIPTION

Definitions

To the extent necessary to provide descriptive support, the subject matter and/or text of the appended claims is incorporated herein by reference in their entirety.

It will be understood by all readers of this written description that the exemplary aspects and embodiments described and claimed herein may be suitably practiced in the absence of any recited feature, element or step that is, or is not, specifically disclosed herein.

It is to be noted that the term "a" or "an" entity refers to one or more of that entity; for example, "a pigment," is understood to represent one or more pigments. As such, the terms "a" (or "an"), "one or more," and "at least one" can be used interchangeably herein.

Furthermore, "and/or" where used herein is to be taken as specific disclosure of each of the specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, technical and scientific terms used herein have the same meaning as commonly understood by one of ordinary skill in the art to which this disclosure is related. Numeric ranges are inclusive of the numbers defining the range. Even when not explicitly identified by "and any range in between," or the like, where a list of values is recited, e.g., 1, 2, 3, or 4, unless otherwise stated, the disclosure specifically includes any range in between the values, e.g., 1 to 3, 1 to 4, 2 to 4, etc.

The headings provided herein are solely for ease of reference and are not limitations of the various aspects or aspects of the disclosure, which can be had by reference to the specification as a whole.

For purposes of this disclosure, a "fugitive color" is as defined in Section 6 of U.S.D.A. Forest Service specification 5100-304c, June 2007, as follows: "A coloring agent that imparts a high degree of visibility to the mixed product when first applied to wildland fuels but will gradually disappear over several months." In certain aspects, the dye color intensity is negatively impacted by the ultraviolet intensity of natural sunshine.

As used herein, a "dye" is a coloring material used in solution for staining other materials and a "pigment" is a colored solid powder that is mixed with other materials to alter their color.

As used herein, a "finely divided" material means that ≥99.5% of particle sizes are <44 microns, as determined per the art established standard ISO 787-7, which is incorporated herein by reference in its entirety. For example, a finely divided pigment grade red iron oxide generally falls within the range of 1 to 5 microns.

As used herein, "particle density" is the volumetric mass of the solid and differs from "apparent density" because the volume used does not contain pores or spaces. This value can be obtained by placing a known weight of powder in a liquid and measuring the volume displacement with a graduated cylinder.

As used herein "apparent bulk density" is the mass of a sample taken without compaction divided by volume as measured using the art established ASTM D6683-01, which is incorporated herein by reference in its entirety.

As used herein, "oil absorption"—expressed in X g/100 g of pigment—is the amount of oil (X g) it takes to turn 100 g of pigment into a paste of smooth consistency as measured using the art established standard ISO 787-5, which is incorporated herein by reference in its entirety.

As used herein, "mean particle size" is the average particle size diameter as measured using a LS 13 320 instrument that uses laser diffraction methods as described in the art established standard ISO 13320-1, which is incorporated herein by reference in its entirety.

This disclosure relates to fugitive color systems and storage-stable fugitive colored liquid long-term fire retardant compositions comprising a fugitive color system. The fugitive color system comprises a fugitive color pigment. In particular, disclosed herein is the identification of fugitive color pigments exhibiting hydrophilic or diminished hydrophobic tendencies. And, in certain aspects, the fugitive color pigment is fluorescent. Further, in certain aspects, the combination of a hydrophilic fugitive colorant system of this disclosure is significantly easier to wet, incorporate, disperse, and/or homogenize within aqueous long-term wildland fire retardant concentrates, both during manufacture and during subsequent static storage. Also, in certain aspects, a liquid fire-retardant concentrate containing the fugitive colorant system exhibits improved storage stability, for example, both in terms of the length of time before the initiation of separation and sedimentation and the rate of separation during long term static storage. For example, in certain aspects, such improved storage stability is observed even at the maximum expected 120° F. (49° C.) elevated temperature experienced in summer time fire-prone areas. Stable concentrate suspensions maintain a homogeneous system of the functional components in a concentrated liquid, minimizing the need for continual reconstitution. Lastly, when separation does ultimately occur during prolonged storage of the fugitive colored liquid fire retardant concentrate, it is easily observable because the colorant pigment and other insoluble components settle from the top of the concentrate, leaving behind an obvious transparent layer rather than simultaneously rising within the concentrate mass and settling from the center of the liquid concentrate column where it cannot be seen as is experienced with previous fugitive colored long-term retardant concentrates.

Certain aspects of the present invention involve improved storage stability as determined by monitoring an increase in turbidity of diluted samples of a liquid fire-retardant concentrate of the present invention. For example, liquid fire-retardant concentrates of the present invention have been observed to exhibit substantially constant stability as indicated by an increase in Nephelometric Turbidity Units (NTU) of no more than about 25%, no more than about 20%, no more than about 15%, or no more than about 12% for a plurality of diluted concentrate samples tested after storage for 7 days. Similarly, liquid fire-retardant concentrates of the present invention have been observed to exhibit substantially constant storage stability as indicated by a standard deviation of Nephelometric Turbidity Units (NTU) of less than about 25%, less than about 20%, less than about 12% for a plurality of diluted concentrate samples tested after storage for 7 days. Liquid fire-retardant concentrates of the present invention typically also exhibit improved storage stability for up to 14 days (or even longer) as indicated by visual observation and/or by satisfying one or more of the criteria listed above.

Fugitive Color System

Provided herein is a fugitive color system comprising a fugitive pigment and a water insoluble opaque material. The fugitive pigment comprises a dye encapsulated within a polymeric material. One purpose for encapsulating the dye within the polymer material is so that the dye does not stain the people, equipment, etc. with which it comes into contact. In certain aspects, the polymeric material can be, for example, petroleum resins (CAS #64742-16-1), melamine (CAS #108-78-1), and the like as known to one of ordinary skill in the art. In certain aspects, the dye is a fluorescent dye. In certain aspects, the dye and the polymer work together to achieve fluorescence, e.g., the dye and resin combination comprising the fugitive pigment fluoresces. Unlike fugitive pigments presently used in fugitive color systems for fire retardants, the fugitive pigment of this disclosure exhibits hydrophilic or reduced hydrophobic behavior in comparison to the currently utilized fugitive pigments. In certain aspects, the fugitive pigment is hydrophilic. In certain aspects, the fugitive pigment is easy to incorporate into an aqueous media. In certain aspects, the fugitive pigment more easily incorporates into an aqueous media in comparison to a control fugitive pigment that does not exhibit hydrophilic behavior and/or is not hydrophilic. For example, the fugitive pigment may be a hydrophobic control fugitive pigment containing Solvent Red 1 dye CAS #1229-55-6, two hydrocarbon resins CAS #64742-16-1 and CAS #64742-94-5, and $TiO_2$ CAS #13463-67-7 opacifier, in the amounts of 80-88% resin, 7-10% dye, and 5-10% $TiO_2$ opacifier. Distinguishing characteristics of currently used fugitive color systems, in comparison to the fugitive color system of this disclosure, are that currently used fugitive color systems are not fluorescent, they do not contribute to concentrate stability during static storage, they are marginal in visibility when freshly applied, and they do not result in retardant solutions that maintain homogeneity during static storage.

An opaque material is one that is neither transparent nor translucent and by "water insoluble," it is meant that the water solubility is ≤5% as determined by the art established standard ISO 787-3, which is incorporated herein by reference in its entirety. In certain aspects, the water insoluble opaque material comprises a finely divided iron oxide pigment, zinc ferrite, tri-calcium phosphate, barium phosphate, or titanium dioxide. In certain aspects, the water insoluble opaque material comprises a finely divided iron oxide pigment. In certain aspects, the opacifier is in a minor amount. In certain aspects, the opacifier is in an amount of about 0.1% to about 0.8% (wt/wt). In certain aspects, the fugitive colored liquid long-term fire retardant exhibits a hue optically visible to the human eye when applied as relatively thin ($1/8^{th}$ inch thick) films on the trees, brush, grasses, and mixtures thereof, that are encountered in wildland and other under developed fire-prone rural areas.

In certain aspects, a fugitive pigment of this disclosure exhibiting hydrophilic behavior and/or a fugitive pigment that is hydrophilic is a fluorescent fugitive pigment. Representative fluorescent pigments useful in this disclosure are, for example, described in U.S. Pat. No. 5,439,968 "Fluorescent Pigment Concentrates," which is incorporated herein by reference in its entirety.

Further in accordance with the present invention, in certain aspects the fugitive pigment is formaldehyde-free. This feature provides an improved fugitive pigment where the presence of formaldehyde is undesired. It is to be understood that a formaldehyde-free fugitive pigment in accordance with the present invention may be combined with any or all of the other components listed herein and/or may be utilized in compositions (e.g., a fugitive color system or liquid fire-retardant concentrate) defined by any or all of the properties listed herein.

In certain aspects, the fugitive pigment or dye is magenta. In certain aspects, the fugitive pigment or dye is a fluorescent magenta in color. In certain aspects, the fluorescent pigment or dye has a Lab color spacing of "L" in a range from about 34 to about 89, "a" in a range from about 18 to about 83, and "b" in a range from about −61 to about 56. It was observed that a magenta fluorescent fugitive pigment was an optimum colorant based on its visibility within the many colors found in wildland brush, timber, trees, grasses, etc. However, one of ordinary skill in the art will recognize that the fugitive pigments of this disclosure are not limited to magenta or fluorescent magenta.

In certain aspects, a fluorescent fugitive pigment is any one of the ECO Pigments manufactured by DayGlo Corporation. In certain aspects, the fluorescent fugitive pigment is ECO-20, Ultra Violet manufactured by DayGlo Corporation. In certain aspects, the fluorescent fugitive pigment is ECO-21, Corona Magenta manufactured by DayGlo Corporation (1-5 weight % C.I. Basic Violet 11, CAS-No. 2390-63-8 and 1-5 weight % C.I. Basic Red 1:1, CAS-No. 3068-39-1; melting/freezing point 145° C.-150° C.; specific gravity 1.2). In certain aspects, the fluorescent fugitive pigment is ECO-15, Blaze Orange manufactured by DayGlo Corporation. In certain aspects, the fluorescent fugitive pigment is ECO-14, Fire Orange manufactured by DayGlo Corporation. In certain aspects, the fluorescent fugitive pigment is ECO-13, Rocket Red manufactured by DayGlo Corporation. In certain aspects, the fluorescent fugitive pigment is ECO-11, Aurora Pink manufactured by DayGlo Corporation. In certain aspects, the fluorescent fugitive pigment is ECO-21, Corona Magenta manufactured by DayGlo Corporation. In certain aspects, the fluorescent fugitive pigment is Magenta 108PB distributed by Royale Pigments & Chemicals (Appendix A).

It has been discovered that in certain aspects, the fugitive pigments of the fugitive color system of this disclosure share in common possession of at least one of the following properties:

(i) a 0.5% (w/w) suspension of the fluorescent fugitive pigment in distilled $H_2O$ has a pH of about pH 4 to pH 7 (about pH 5.6 in certain aspects);

(ii) the fugitive pigment has a softening point of ≥60° C. (about 134° C. in certain aspects);

(iii) the fugitive pigment has a melting range of ≥130° C. (about 145° C. to about 150° C. in certain aspects);

(iv) the fugitive pigment has a particle density of about 1.2 g/ml to about 1.5 g/ml (about 1.2 g/ml in certain aspects);

(v) the fugitive pigment has an apparent bulk density of about 0.25 g/ml to about 0.37 g/ml (about 0.37 g/ml in certain aspects);

(vi) the fugitive pigment exhibits oil absorption of about 55 g/100 g to about 80 g/100 g (about 80 g/100 g pigment in certain aspects); and (vii) the fugitive pigment has a mean particle size of about 4.5 μm to about 5.0 μm.

In certain aspects, a fugitive pigment of the disclosure possess, one or more, two or more, three or more, four or more, five or more, or six or more of the above properties. In certain aspects, a fugitive pigment of the disclosure possesses, one, two, three, four, five, six, or all seven of the above properties.

Liquid fire-retardant concentrates comprise a dry-powder component incorporated within an aqueous component. In certain aspects, the dry-powder component of a fugitive colored liquid long-term fire retardant of this disclosure comprises a fugitive color system and one or more of: a suspending agent; a biopolymer (such as xanthan, rhamsan or welan); an opacifier; and corrosion inhibitors (for example, those selected to inhibit corrosion of aluminum, steel, brass and sometimes magnesium). In certain aspects, the dry powder component can also contain surfactants, de-foamers, anti-foamers, and other functional components.

A dry powder's ability to wet is related to its surface free energy milliNewton per meter (mN/m) as determined in all values disclosed herein via the Washburn method, using a K100 force tensiometer and SH0820 sample holder. The Washburn method is a method for measuring the contact angle and the surface free energy of porous substances such as bulk powder or pigments, and absorbent materials such as paper or textiles (Washburn, E. W., Phys. Rev. 17, 374 (1921)). In a representative example of a Washburn measurement, a glass tube with a filter base filled with powder comes into contact with a test liquid. The liquid is drawn up as a result of capillary action. The increase in mass of the tube, which is suspended from a force sensor, is determined with respect to time during the measurement. If the bulk powder is looked upon as a bundle of capillaries, then the process can be described by the Washburn equation:

$$\frac{m^2}{t} = \frac{c \cdot \rho^2 \cdot \sigma \cdot \cos\theta}{\eta}$$

(m=Mass; t=Flow time; σ=Surface tension of the liquid; c=Capillary constant of the powder; ρ=Density of the liquid; θ=Contact angle; η=Viscosity of the liquid)

The constant c includes the number of micro-capillaries and their mean radius, and depends on the nature of the powder and also on that of the measuring tube. Plotting the square of the mass $m^2$ against time t shows a linear region, the slope of which, for known liquid properties (σ, ρ and η), only contains the two unknowns c and θ. To determine the constant c, a measurement is carried out with an optimally wetting (spreading) liquid (e.g. n-hexane), with which the contact angle θ is 0° (cos θ=1). The value of c is substituted in the equation in order to determine the contact angle θ with the help of other liquids. The contact angle measured in this way is an advancing angle, as it is measured in the course of wetting. The surface free energy of the powder can be calculated from the contact angle data with the help of different models. As c depends on the bulk density, it should be ensured that the powder is packed consistently for all measurements on the same powder.

The rule of thumb is that the surface free energy of the powder has to be higher than the surface tension of the liquid for spontaneous wetting to occur. That is, the higher the surface free energy of the dry powder, the more easily it is wetted. Liquid ammonium phosphate has a surface tension of about 90 mN/m. It was observed that a dry-powder formulation containing a conventional fugitive pigment had a surface free energy of about 32.0 mN/m. In contrast, the same dry-powder formulation containing a fugitive color system of the present disclosure had a surface free energy greater than 32 mN/m. In certain aspects of this disclosure, a dry-powder formulation for use in a liquid fire-retardant concentrate has a surface free energy greater than 32 mN/m. In certain aspects, a dry-powder formulation for use in a liquid fire-retardant concentrate has a surface free energy of about 33, 35, 40, 45, 48.8, 50, 55, 58.8, 60, 65, 70, 75, 80, 85, or 90 mN/m, or any range in between. In certain aspects, a dry-powder formulation for use in a liquid fire-retardant concentrate has a surface free energy of greater than about 33, 35, 40, 45, 48.8, 50, 55, 58.8, 60, 65, 70, 75, 80, 85, or 90 mN/m. Another characteristic that can distinguish powders is the "polar component" value (also determined via the Washburn method, using a K100 force tensiometer and SH0820 sample holder). The higher the polar component value, the better the wetting behavior the powder has with polar solvents. It was observed that a dry-powder formulation containing a conventional fugitive pigment had a polar component of 4.1. In contrast, the same dry-powder formulation containing a fugitive color system of the present disclosure had a polar component significantly greater than 4.0. In certain aspects, a dry-powder formulation for use in a liquid fire-retardant concentrate has a polar component value of about 5, 6, 7, 8, 10, 12, 15, 20, 20.9, 25, 26.5, 30, 35, 40, 45, 50 or any range in between. In certain aspects, a dry-powder formulation for use in a liquid fire-retardant concentrate has a polar component of greater than about 5, 6, 6, 7, 8, 10, 12, 15, 20, 20.9, 25, 26.5, 30, 35, 40, 45, or 50. In certain aspects, a dry-powder formulation with the above defined characteristics comprises any fugitive color system as descried elsewhere herein.

In certain aspects of this disclosure, a dry-powder formulation for use in a liquid fire-retardant concentrate is synonymous with a fugitive pigment. Thus, in certain aspects, a fugitive pigment of this disclosure has a surface free energy greater than 32 mN/m. In certain aspects, a fugitive pigment has a surface free energy of about 33, 35, 40, 45, 48.8, 50, 55, 58.8, 60, 65, 70, 75, 80, 85, or 90 mN/m, or any range in between. In certain aspects, a fugitive pigment has a surface free energy of greater than about 33, 35, 40, 45, 48.8, 50, 55, 58.8, 60, 65, 70, 75, 80, 85, or 90 mN/m. In certain aspects, a fugitive pigment has a polar component value of about 5, 6, 7, 8, 10, 12, 15, 20, 20.9, 25, 26.5, 30, 35, 40, 45, 50 or any range in between. In certain aspects, a fugitive pigment has a polar component of greater than about 5, 6, 6, 7, 8, 10, 12, 15, 20, 20.9, 25, 26.5, 30, 35, 40, 45, or 50.

In accordance with the foregoing, in certain embodiments, the present invention defines a fugitive color system for use in a fire retardant with the fugitive color system comprising a fugitive pigment and a water insoluble opaque material. The fugitive pigment (e.g., generally comprising a dye and encapsulated within a polymeric material) is characterized by a surface free energy of at least about 45 mN/m and a polar component value of at least about 20 mN/m. Such a fugitive color system may be defined by any or all of the above-listed properties. Advantageously in accordance with the present invention, the color system incorporates a formaldehyde-free fugitive pigment.

The present invention is also directed to dry-powder formulations (e.g., a particulate fugitive pigment) exhibiting various advantageous properties. For example, the particulate fugitive pigment may exhibit a mean particle of at least about 4.0 μm, at least about 4.5 μm, or from about 4.0 to about 5.0 μm. In certain aspects, such fugitive pigments are formaldehyde-free and/or defined by one or more of the properties noted elsewhere herein (e.g., surface free energy and/or polar component value).

Liquid Fire-Retardant Concentrate

Provided for herein is a liquid fire-retardant concentrate comprising a fugitive color system and/or dry-powder component (which comprises a fugitive color system) as disclosed herein, suspended in a liquid fire-retardant component. In certain aspects, the fugitive pigment of the fugitive color system and/or dry powder component is fluorescent. In certain aspects, the fugitive color system and/or fugitive pigment of the color system is capable of stabilizing the fire-retardant concentrate. As used herein, "stabilizing," "stabilizes," and the like refers to the stabilization of the composition of the insoluble components within the liquid component of the concentrate (as exemplified in the Examples which follow). In certain aspects, the fugitive color system and/or fugitive pigment of the color system stabilizes the fire-retardant concentrate. In certain aspects, the liquid fire-retardant concentrate also comprises one or more of: a suspending clay, a corrosion inhibiting system, or a biopolymer, suspended in the liquid fire-retardant component. In certain aspects, the fugitive color system is in an amount of about 1.0% to about 1.5% (w/w) of the fire-retardant concentrate. For example, in an amount of about 0.9%, 1.0%, 1.2%, 1.3%, 1.4%, 1.5%, or 1.6% (w/w) of the fire-retardant concentrate. In certain aspects, the liquid fire-retardant component is selected from the group consisting of an ammonium phosphate solution, and ammonium sulfate solution, an ammonium thiosulfate solutions, and mixtures thereof. For example, in certain aspects, the liquid fire-retardant component is an ammonium phosphate solution. In certain aspects, the liquid fire-retardant concentrate comprises a fugitive color system as disclosed herein, a suspending clay, a corrosion inhibiting system, and a biopolymer, all of which are suspended in the liquid fire-retardant component.

In certain aspects, the liquid ammonium polyphosphate component is selected from agricultural liquid fertilizer solutions containing about 10 to 11% ammonia, about 34 to 37% phosphorus pentoxide, and 0% potassium oxide. These solutions are generally referred to in the field as either 10-34-0 or 11-37-0 liquid concentrates. In certain aspects, the ammonium phosphate component is a 10-34-0 agricultural liquid fertilizer solution. In certain aspects, the ammonium phosphate component is an 11-37-0 agricultural liquid fertilizer solution. In some cases, during the manufacture of the fertilizer solutions, anhydrous ammonia is added to orthophosphoric acid in an enclosed pipe reactor. When the anhydrous ammonia reacts with the phosphoric acid in an enclosed area, both pressure and temperature increase resulting in the formation of condensed ammonium phosphates, i.e., ammonium pyrophosphates, short chain length ammonium polyphosphates, perhaps some ammonium metaphosphates, and other longer chain species. Generally, 10 to 20% of the phosphoric acid remains as monoammonium orthophosphate and/or diammonium orthophosphate in freshly manufactured 11-37-0, although the amount of orthophosphate in the liquid solution increases during storage via hydrolyses of the polymers and a decrease in the amount of the condensed phosphates. After aging for several months in ambient temperatures, the amount of orthophosphate can be equal to or more than the amount of condensed ammonium phosphates. While in certain aspects, 10-34-0 and 11-37-0 are chosen because they are readily commercially available, it should be recognized that similar solutions with higher or lower levels of ammonia and phosphorus pentoxide can also be used as the liquid component. In certain aspects, ammonium sulfate solutions can also be substituted for ammonium phosphate solutions when formulating long-term fire retardants. Although Forest Service Specifications currently require the use of only ammonium phosphate based fire retardant in products meeting the requirements of Federal Government Agencies, it should be recognized that other liquid fire retardants could be used, for example: ammonium sulfate solutions or ammonium thiosulfate solutions.

Further in accordance with the present invention, the fire retardant component of concentrates of the present invention may include a combination of monoammonium phosphate (MAP) and diammonium phosphate (DAP). Typically in accordance such concentrates a suspending agent (e.g., micronized clay) is further included). In accordance with the present invention, the fire-retardant concentrates can be prepared using technical grade MAP and DAP which lack detectable levels of sulfate, thus providing a "sulfate-free" composition. In other instances, the concentrates can be prepared using fertilizer grade MAP and DAP which can contain low levels of sulfates. When prepared using fertilizer grade MAP and DAP, the amount of sulfate in the liquid concentrate may be less than the detectable amount in an equivalent composition prepared using ammonium polyphosphate. Thus, the amount of sulfate in the liquid concentrate can constitute less than about 2%, less than about 1%, or less than about 0.5% by total weight of the composition. In some embodiments, the concentrates comprise less than about 1.5%, less than about 1.4%, less than about 1.3%, less than about 1.2%, less than about 1.1%, or less than about 1% detectable sulfates by weight of the composition.

Generally, any of the liquid fire-retardants utilized in the concentrates of the present invention can comprise at least one ammonium phosphate. In certain embodiments, the ammonium phosphate comprises, consists essentially of, or consists of monoammonium phosphate (MAP). In other embodiments, the ammonium phosphate comprises, consists essentially of, or consists of diammonium phosphate (DAP). In some embodiments, the liquid fire retardant concentrate compositions provided herein comprise a mixture of ammonium phosphates. In certain embodiments, the ammonium phosphate or mixture of ammonium phosphates has a molar ratio of ammoniacal nitrogen to phosphorus (N/P ratio) in a range from about 1.1 to about 1.9. In certain embodiments, the ammonium phosphate or mixture of ammonium phosphates has a molar ratio of ammoniacal nitrogen to phosphorus (N/P ratio) in a range from about 1.35 to about 1.65. In certain embodiments, the ammonium phosphate or mixture of ammonium phosphates has a molar ratio of ammoniacal nitrogen to phosphorus (N/P ratio) in a range from about 1.4 to about 1.6. In certain embodiments, the ammonium phosphate or mixture of ammonium phosphates has a molar ratio of ammoniacal nitrogen to phosphorus (N/P ratio) in a range from any of about 1.1, 1.2, 1.3, 1.35, 1.4, 1.5, 1.6, 1.7, or 1.8 to any of about 1.2, 1.3, 1.4, 1.5, 1.6, 1.65, 1.7, 1.8, or 1.9. The concentrate and its solutions generally contain less ammonia in comparison with previous products, and can result for example, in a lower aquatic toxicity.

The mixture of ammonium phosphates can comprise at least two ammonium phosphates. In certain embodiments, the mixture of ammonium phosphates comprises, consists essentially of, or consists of monoammonium phosphate (MAP) and diammonium phosphate (DAP). In certain embodiments, the MAP contains from about 10% or 11% to about 12% ammonia by weight and from about 40% or 55% to about 61% phosphorus pentoxide by weight. In certain embodiments, the DAP contains from about 16% to about 21% ammonia by weight and from about 40% to about 54% phosphorus pentoxide by weight. Further, in certain embodiments, the weight ratio of MAP to DAP is in the range of from about 5% to about 60% MAP to about 40% to about 95% DAP of the total ammonium phosphate in the concentrate. In certain embodiments, the weight ratio of MAP to DAP is in the range of from about 40% to about 60% MAP to about 40% to about 60% DAP of the total ammonium phosphate in the concentrate. In certain embodiments, the weight ratio of MAP to DAP is in the range of from about 50% to about 60% MAP to about 40% to about 50% DAP of the total ammonium phosphate in the concentrate.

In further embodiments, a fire-retardant concentrate composition comprises from about 19% to about 50% by weight of DAP. The composition can comprise from about 19% to about 47% by weight of DAP. For example, the composition can comprise from about 20% to 30% of DAP. In some instances, the composition comprises from about 25% to about 27% by weight of DAP (e.g., about 26%).

In still further embodiments, the fire-retardant concentrate composition comprises from about 1% to about 30% of MAP. The composition can comprise from about 10% to about 30% of MAP. For example, the composition can comprise from about 20% to about 30% by weight of MAP. In some instances, the composition comprises from about 22% to about 24% by weight of MAP (e.g., about 23%).

As noted above, in accordance with the present invention various embodiments incorporate the MAP and DAP within certain preferred ratios to enhance solubility of the ammonium phosphates. Therefore, in certain embodiments, the weight ratio of MAP to DAP is from about 40:60 to about 60:40, or from about 45:55 to about 55:45 (e.g., about 46:54 or about 47:53).

Further in accordance with the present invention, the fugitive color systems and fugitive pigments of the present invention may be incorporated into and/or combined with liquid fire-retardant concentrate compositions, fire-retardant solutions, etc. as defined in U.S. Provisional Application Ser. No. 62/802,902, filed Feb. 8, 2019 (Attorney Docket No. 3514297.0102; PSOL 9098.USP) and U.S. Ser. No. 15/670, 422 (Attorney Docket No. 3514297.000501; PSOL 9089.US), the entire contents of which are hereby incorporated by reference for all relevant purposes.

In certain aspects, a liquid fire-retardant concentrate comprising a fugitive pigment of this disclosure exhibits compositional stability throughout. In certain aspects, a liquid fire-retardant concentrate comprising a fugitive pigment of this disclosure is more stable than a control fire-retardant concentrate that is identical in composition except for not containing the fugitive pigment of this disclosure.

In certain aspects, during manufacture of a long-term liquid fire retardant concentrate, the dry powder components are weighed individually and blended together to form a premix. Then a specified weight, or volume, of liquid ammonium phosphate solution is added to a tank fitted with an agitator capable of shearing, stirring and homogenizing the two components together. Agitation of the concentrate is continued until the two components are thoroughly homogenized. That is, in certain aspects, a method of producing a liquid fire-retardant concentrate comprises mixing a premix component comprising a fugitive color system of this disclosure with a liquid fire-retardant component. In certain aspects, the liquid fire-retardant component is any as disclosed elsewhere herein.

It has been shown that in order to achieve homogeneity; the length and/or intensity of agitation may need to be altered dependent on the characteristics of the dry powder components in the premix. The composition of a typical liquid fugitive colored long-term fire retardant concentrate is illustrated in Table 1.

TABLE 1

Liquid Long-Term Fugitive Colored Fire Retardant Concentrate Composition.

| Composition | Amount (weight %) |
| --- | --- |
| Liquid ammonium phosphate such as 11-37-0 or 10-34-0 | 93.0 to 95.0 |
| Biopolymer, xanthan, rhamsan or welan | 1.0 to 2.0 |
| Clay, attapulgus, kaolin or other | 1.0 to 2.0 |
| Fluorescent fugitive color pigment | 1.0 to 2.0 |
| Red iron oxide | 0.1 to 0.8 |
| Ferric pyrophosphate | 2.0 to 4.0 |
| Azole corrosion inhibitor | <1.0 |

Thus, in certain aspects, the premix further comprises one or more of a suspending clay, a corrosion inhibiting system, and/or a biopolymer. In certain aspects, one of ordinary skill in the art will understand to vary the weights of the components in order to obtain the required concentration of a critical moiety or the desired physical properties of the concentrate or solution. For example, the ammonium polyphosphate received from a supplier does not always contain exactly 34.0% or 37.0% phosphorus pentoxide ($P_2O_5$) that is the critical moiety necessary for fire retardation. In order to correct for this, the amount of ammonium phosphate solution must be varied to assure that the concentrate and its solutions have the required amount of this substance and consequently always perform as expected. In certain aspects, the biopolymer has been shown to function as both a corrosion inhibitor and solution thickener. It can function as a corrosion inhibitor for aluminum alloys in the concentrate but does not function as a thickener until dilution water is added to prepare the solution. Consequently, the biopolymer concentration may need to be varied slightly to obtain the viscosity or to reduce corrosion. In certain aspects, the quantity of clay can also be altered to obtain the desired concentrate viscosity. Since all lots of clay do not possess identical thickening capability, it can be necessary to make slight adjustments in the amount of clay to obtain the desired concentrate viscosity. In certain aspects, a small amount of iron oxide is added as an opacifier for the fugitive color pigment and is considered a part of the fugitive color system. In certain aspects, the fugitive color system, for example a fluorescent fugitive color system, is in general transparent. It has been shown that a small amount of iron oxide or other relatively inert, powdered particulates further opacifies the pigment and thereby cause a more vivid color to be perceived optically. The quantity of opacifier material is minimized, however, so that it does not significantly impact the faded color of the fugitive color pigment. Agricultural grade ammonium phosphate solutions can contain a relatively high and varying level of impurities. Thus, in certain aspects, the quantities of ferric phosphate and triazole can be varied to maintain a low corrosion rate in both the concentrate and its solution.

Field experimentation was conducted in the search for a more optically visible color pigment for use in long-term, liquid ammonium phosphate fire retardant solutions used in the attack of wildland fires. It was determined that a fluorescent, magenta-colored pigment, that was one of several potential pigments involved in the testing, was considerably more visible to the human eye than a comparable loading, or even a higher loading, of the International orange-red pigment that had been used for more than 30-years and any of the other experimental pigments and mixtures thereof.

During subsequent laboratory experimentation, it was observed that premixes comprising certain color pigments previously unused in fire-retardant solutions wet much easier than expected when added to an agitated aqueous ammonium phosphate concentrate during manufacture and, subsequently, were slower to separate and settle during long term storage. Thus for purposes of this disclosure and as used herein, these easier to wet fugitive pigments are referred to as having hydrophilic tendencies, as having reduced hydrophobic tendencies, as hydrophilic pigments, and the like, and prior pigments as hydrophobic pigments. In view of their organic surfaces, both said hydrophilic pigments and prior hydrophobic pigments can exhibit some degree of hydrophobic tendency. However, the magnitude of the difference between the hydrophilic pigments and the hydrophobic orange-red (non-fluorescent) pigment, in terms of the ease of incorporation, dispersion and homogeneity within an aqueous ammonium phosphate solution, the storage stability of subsequently prepared solutions and its performance when mixed with aqueous ammonium phosphate solution demonstrate that there is a vast difference between the two in degree of aversion to water.

Fire-Retardant Solutions

Provided for herein is a method of producing a fire-retardant solution comprising diluting a liquid fire-retardant concentrate as disclosed herein with water. Thus, certain aspects provide for a fire-retardant solution produced by diluting a liquid fire-retardant concentrate as disclosed herein with water. Certain aspects provide for a fire-retardant solution, wherein the solution comprises the liquid fire-retardant concentrate diluted in water. In certain aspects, the liquid fire-retardant concentrate is diluted with water at the concentrate:water ratio required to provide minimum acceptable fire-retardation performance as defined by U.S.D.A. Forest Service Specification 5100-304c (U.S. Patent Pub. No. 2018/0037998, which is incorporated herein by reference in its entirety).

In certain aspects, the fugitive pigment of the fugitive color system of the fire-retardant concentrate is capable of stabilizing the solution. In certain aspects, the fugitive pigment of the fugitive color system of the fire-retardant concentrate stabilizes the solution. In certain aspects, the fire-retardant solution comprising the fugitive pigment is more stable than a control fire-retardant solution that is identical in composition except for not containing the fugitive pigment.

Further provided herein is a method of preparing a fire retardant composition adapted for aerial application to wildland fuels and wildland fires, the method comprising the steps of: (a) forming an intermediate storage-stable liquid concentrate composition comprising at least (i) a liquid fire retardant comprised of at least one ammonium polyphosphate, (ii) a fugitive pigment of this disclosure, (iii) and optionally other functional components, (b) dilution of the liquid composition with water to form a fire-retardant solution exhibiting a minimum standard of fire-retardantcy, (c) applying the fire-retardant solution on wildland fuels threatened by fire or (d) on the periphery of the fuel:fire interface, resulting in a reduction in fire intensity.

Also disclosed herein is a storage-stable liquid fire-retardant solution obtained by diluting any one of the liquid fire-retardant concentrates of this disclosure with water at a ratio of 5.5 volumes of water per 1.0 volume of the liquid fire retardant concentrate.

In certain aspects, when using a liquid fire-retardant concentrate of the type described in U.S. Pat. Nos. 6,780,991B2 and 6,828,437B2 (both incorporated herein by reference in their entireties), one volume of the concentrate is blended with 5.5 volumes of potable water to yield about 6.5 volumes of retardant solution. The U. S. Forest Service determines the prescribed dilution rate during their testing as described in the previously mentioned Federal Specification. This rate is based on the level of fire retarding salt or moiety present in the concentrate. The fire retardant capability of ammonium phosphate solution is dependent on the available phosphorus pentoxide ($P_2O_5$) content of the fire retardant concentrate. If the solution or concentrate is not homogeneous at the time it is withdrawn from storage, the resultant fire retardant solution may not perform as expected resulting in property loss and perhaps death.

In certain aspects, the liquid retardant concentrate is stored in one or more tanks in the out-of-doors (typically ranging in capacity of from 3,000 to 25,000 gallons, or possibly higher up to, for example, 80,000 gallons) at an airport, or other fire Agency facility, ready for immediate use when a fire emergency occurs. In certain aspects, liquid long-term fire retardant concentrates are also stored in 1000-liter portable totes in situations where permanent storage tanks are not available. In certain aspects, these tanks and totes contain no internal mixing or stirring equipment although they are generally capable of recirculation via pumping accessories. The length of concentrate storage can range from a few minutes from receipt to, perhaps a year, two years, three years, or more. Because in certain aspects, the tanks are out-of-doors and unheated or cooled, the temperature of the solution can vary from below zero during winter months to 100° F. or more during the fire-prone summer months. (Forest Service Specification 5100-304c requires that retardant concentrates and their diluted solutions provide an effective amount of corrosion protection at 120° F. so this is generally accepted as the expected maximum storage temperature).

EXAMPLES

Example 1

Concentrate Stability Determined by Visual Observation:

Long-term liquid fire retardant concentrates were prepared within the compositional parameters described in Table 1. Two Concentrates were prepared. The first (1) contained a control, standard orange-red, non-fluorescent hydrophobic pigment and the other (2) contained a magenta colored, fluorescent, hydrophilic fugitive pigment. Table 2 below illustrates certain properties of the two pigments.

The Concentrates were prepared identically as herein described. The dry powder premix components were weighed individually and then blended together to form a homogeneous powder. Simultaneously, the pre-determined amount of ammonium polyphosphate solution (11-37-0) was added to a stainless steel mixing vessel fitted with a baffle and a laboratory stirrer adjusted to a rotational speed of 1200 rpm. The dry powder premix was then slowly added into the center of the agitated liquid. When necessary a spatula was used to scrape dry or partially wetted powder from the container walls and the agitator shaft. When all of the powder was incorporated into the liquid, agitation was increased to 3500 rpm and continued for 20 minutes. It was noted that Pigment 1 was more difficult to wet, requiring considerable manual cleaning in order to obtain complete incorporation of the semi-wetted pigment into the liquid phase. The semi-wetted pigment rises to the surface of the agitated mixture acting as a hydrophobe. At the end of mixing, Concentrate 1 had a viscosity of 210 cPs when measured with a Brookfield Model LVT viscometer fitted with Spindle 2 rotating at 60 rpm. Concentrate 1 exhibited a Specific Gravity (SpG) of 1.454 grams per cubic centimeter at 70° F./21° C. Under the same conditions, Concentrate 2 exhibited a viscosity of 201 cPs and a SG of 1.456. Three 887-milliliter samples of each concentrate were prepared.

TABLE 2

Characteristics of Fugitive Color Pigments

| | Fugitive Color Pigment | |
| --- | --- | --- |
| | Orange-red Non-fluorescent (1) Hydrophobic Pigment | Magenta Fluorescent (2) Hydrophilic Pigment |
| Color | Int'l Orange-Red | Magenta |
| Ease of dispersion in water | Hydrophobic | Hydrophilic |
| Fluorescent | No | Yes |
| Stability - presence UV light | Fades | Fades |
| Water solubility | insoluble | Insoluble |
| pH - 0.5% sol'n in dist. $H_2O$ | 6.2 | 5.6 |
| Softening Point - ° F./° C. | 265-285/130-140 | 57/134 |
| Melting Range - ° F./° C. | — | 284-302/145-150 |
| Particle Density - g/ml | 1.25 | 1.2 |
| Apparent Bulk Density - g/ml | 0.35 | 0.37 |
| Oil Absorption - g/100 g pigment | 55 | 80 |
| Mean Particle Size -µm | 1.2-1.5 | 4.5-5.0 |
| Formaldehyde present | No | No |

TABLE 3

Composition of Long-Term Liquid Fire Retardant Concentrates.

| Raw Material | Concentrate 1 | Concentrate 2 |
| --- | --- | --- |
| 11-37-0 Ammonium phosphate (%) | 94.0 | 92.7 |
| Biopolymer | 1.1 | 1.1 |
| Micronized clay | 1.4 | 1.4 |
| Int'l orange-red fugitive pigment (1) | 1.0 | |
| New Magenta fugitive pigment (2) | | 1.5 |
| Opacifier (%) | 0.3 | 0.1 |
| Azole corrosion inhibitor | 0.2 | 0.2 |
| Iron pyrophosphate | 2.0 | 3.0 |

Figure 1:
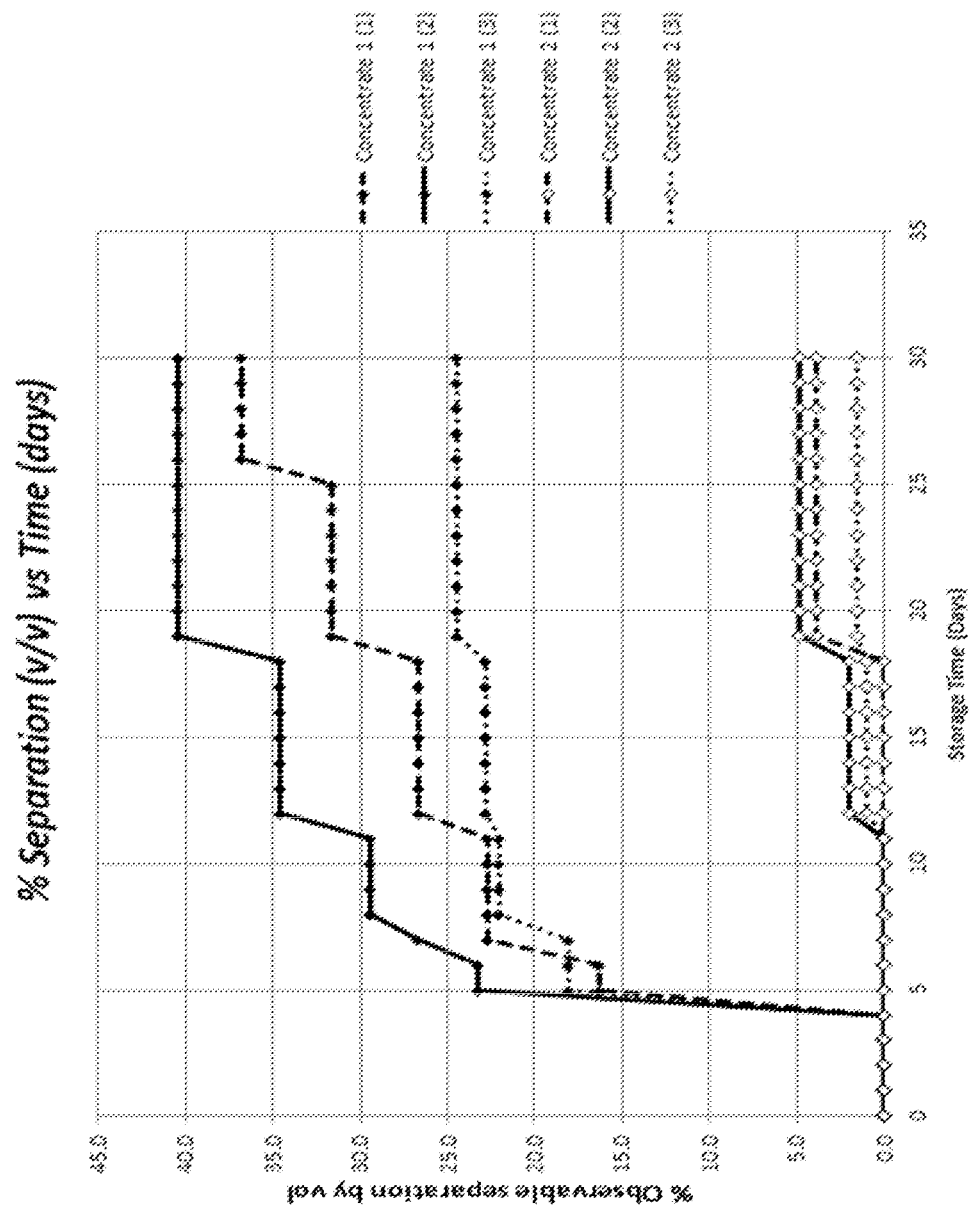
FIG. 1 shows the stability of liquid retardant concentrates (stored at 120° F./49° C.).

Three 800 milliliter samples of each concentrate were transferred into wide-mouth, screw cap, one-quart glass containers for static storage. About one-hour after preparation, the top of Concentrate 1 appeared to have partially dried with a dull matte appearance whereas the top of Concentrate 2 appeared to be a homogeneous, wet suspension with a glossy color. Each container was closed during storage. Previous experience with fire retardant concentrates, revealed that separation and sedimentation occurs most rapidly when stored at elevated temperatures. Consequently, samples stored at elevated temperature received greater scrutiny and separation was confirmed to appear more rapidly at higher ambient storage temperatures. The concentrates were frequently observed visually for signs of separation and sedimentation. FIG. 1 illustrates the observed separation during 30-days of static storage at a temperature of 120° F./49° C. It also demonstrates the degree of storage stability variability that is experienced when the same formulation, manufacturing procedure and storage conditions are repeated in triplicate.

FIG. 1 shows that separation of Concentrate 1 began four days after storage was initiated. In this sample, between 16 and 24% of the sample height at the bottom of the container was a clear green solution, the color of the ammonium polyphosphate component. Thus, it appeared that the insoluble particulates rise from the center of the container toward the upper surface of the container. Such a result would be difficult to observe in field use when the container is a large, metal tank containing several thousand gallons of Concentrate. The solids continued to separate, rising to the point where 25 to 40% of the total volume was clear liquid after 30-days storage.

In contrast, Concentrate 2 exhibited no separation until day eleven and then only 2% separation appearing as clear greenish liquid on the top surface of the liquid where it was clearly visible to the operator. The level of separation subsequently increased to about 5% after 18-days and then remained stable through 30-days. This example demonstrates that, visually, Concentrate 2 appeared to be considerably more stable than Concentrate 1 and, when using Concentrate 2, the operator can clearly observe the degree of separation and the success of reconstitution via recirculation.

Example 2

Ease of Concentrate Incorporation and Dispersion:

Several experiments were conducted to assess differences in the ease of wetting and dispersing the premix of dry powdered components within the aqueous liquid phase of the formulation. In these experiments, the composition and conditions of preparing the Concentrates were held constant in all cases. The composition of the Concentrate is the same as the Concentrate in Table 3. Four different fugitive pigments were evaluated, i.e., two each meeting the herein definition "(orange-red, non-fluorescent) hydrophobic pigment" and "(magenta, fluorescent), hydrophilic pigment".

a. Incorporation of Premix Component within Liquid Phase:

1128-grams of aqueous 11-37-0 ammonium phosphate solution was placed in a 1-liter beaker containing a baffle and a motor driven 2-inch Cowles turbine blade for agitation. With the beaker in place, the agitator motor was adjusted to 1200-rpm. At this speed, there was rapid turnover of the liquid but a vortex was not present. A homogeneous premix of the dry-powder component was prepared separately. This premix was added to the rapidly sheared liquid phase; the premix was added quickly in order to start recording the time necessary to achieve incorporation of the powders within the liquid. A micro spatula was used to scrape dry powder off of the beaker sides, baffle and stirrer shaft moving it into the agitated 200-cP Concentrates. The amount of required manual assistance with the spatula varied with the hydrophobic nature of the fugitive pigment used in the premix. The timer was stopped when all of the premix powders were incorporated within the liquid. Total incorporation of the dry powders within the liquid does not mean that the powders were homogeneously dispersed, only that they were not present on the liquid surface during agitation.

TABLE 4

Time to Incorporate Premix in Liquid Phase.

| Pigment used in formulation | Time to Incorporate (min) |
| --- | --- |
| Hydrophilic Magenta A | 2:75 |
| Hydrophilic Magenta B | 3:00 |
| Hydrophobic Orange-red A | 5:00 |
| Hydrophobic Orange-red B | 4:50 |

While the differences in time to achieve incorporation of the dry powder is not large, the amount of manual manipulation required to keep the powder from clinging to the beaker sides and the stirrer shaft was significant and not possible in a large scale operation. Also, the degree of dispersion of the powder throughout the liquid phase is, at this point, unknown.

b. Dispersion of Premix Component within Liquid Phase:

Following incorporation of the dry-powder premix within the liquid phase, the Cowles turbine agitator was paused for 1-minute while observations were made. When agitation was resumed, the rotational speed was increased to 2100-rpm and continued for 2-minutes. A vortex developed when the speed of agitation was increased. Agitation was again paused for 1-minute to make observations and then continued at the same speed for an additional 5-minutes. Again there was a 1-minute pause while observations were made. When agitation was resumed, the rotational speed was increased to 3500-rpm, near the maximum possible without splashing liquid from the beaker. After 2-minutes at 3500-rpm, stirring was discontinued and final observations made. The observations are as follow:

i. Concentrates containing orange-red non-fluorescent pigment based Premixes: At the end of the incorporation Stage, the surface of Concentrate 1 was covered with a matte consisting of what appeared to be semi-wetted globules of powdered materials. After the first 2-minutes of mixing, at 2100-rpm, the semi-wetted globules continued to appear although the rate of rising to the surface and the size of the globules can have decreased somewhat. At the end of an additional 5-minutes mixing at 2100-rpm, little change was noted in either size or rate of surfacing. A considerable improvement was noted after mixing for two-minutes at 3500-rpm, although smaller semi wetted globules were still apparent and a matte slowly surfaced when agitation was discontinued.

ii. Concentrates containing magenta fluorescent pigment based Premixes: At the end of the incorporation Stage of mixing, the surface of the Concentrate was covered with semi-wetted globules of powder that slowly appeared on the surface after agitation was stopped. The size and number of globules were considerably less than with Concentrate 1. There was a significant decrease in both the rate of surfacing and the size of the globules after mixing for an additional 5-minutes at 2100-rpm. After mixing for 2-minutes at 3500-rpm, no globules were observed on the Concentrate surface and it was glossy.

c. Examination of Concentrate Homogeneity:

After the mixing tests were completed, the consistency of the four premixes was examined by drawing down a film on glass and noting the degree of smoothness and the presence of agglomerates and globules. A sample of each Premix was drawn down on a smooth transparent glass plate using a 0.064 inch stepped edge doctor blade. The films of those Concentrates containing the magenta colored fluorescent fugitive pigment had a high gloss and appeared uniform with no sign of globules or agglomerates. The films of those Concentrates containing the orange red colored non-fluorescent fugitive pigments had a dull color and areas with an opaque/matte appearance indicating that they continued to contain semi-wetted particulates.

Example 3

Viscosity Uniformity within Concentrate Following Storage:

It is important that the liquid concentrate be homogeneous in order for the proper amount of each ingredient in the concentrate to be present when discharged from the storage tank, and diluted during transfer to the delivery vehicle. For example, if the color is not present in the prescribed amount, it will not be possible to distinguish between the vegetative fuel that has been covered with sufficient fire retardant solution to resist burn-through when the wildfire arrives at the retardant-covered fire line. Likewise, if the thickener is either absent or present in excess, the aerial application of the liquid fire retardant will not be optimum, i.e., improper length and width and rate of application. It is, of course, necessary that the other functional components, such as the corrosion inhibitors, be present in the prescribed quantity as well.

While Example 1 illustrated the visual difference between Concentrates 1 and 2, that data was based on observations obtained by visually looking at the outer edge of the cylindrical container and assuming that the interior of the solution is similar to that visible from the outside. Example 3, on the other hand, illustrates the impact of storage on the viscosity of the diluted concentrate present at eight levels ranging from the bottom to the top of the cylinder of liquid Concentrate.

Two 6800-ml samples of each Concentrate 1 and 2 were prepared in accordance with the composition illustrated in Table 1. They were prepared in a 19-liter round container fitted with a baffle attached to one side and using a motor driven 4-inch Cowles turbine blade for agitation. The agitator motor was adjusted to 1250-rpm. The dry powder components were added through the course of one minute. After these components had been added, the mixer speed was increased to 1500 rpm for the next 20-minutes. The mixer speed was then increased to 1800 rpm for 10 minutes before turning off. Two aliquots obtained from each concentrate was transferred to the same type of 800-ml glass container described in Example 1. In this case, however, the side of the glass container was previously measured and marked at each inch starting from the bottom. The height of the solution in the container was 8-inches, thus the marks on the outside of the glass represented 100-milliliter portions of the total. The bottom 100-ml of solution was labeled 1. The next 100-ml was labeled 2 and so forth until the top 100-ml aliquot was labeled 8. The four Concentrate samples were then placed in static storage at 49° C./120° F.

After seven days of static storage, one of the two samples of each Concentrate was removed and divided into eight 100-ml aliquots via syringe starting at the top of the Concentrate sample. This aliquot was placed in a 600-ml beaker. This sequence was continued until all eight portions of the storage sample were retrieved. By continual removal of the top portion, those portions that remained in the storage container remained undisturbed until its time of retrieval. After removal of the eight portions from one 800-ml sample of Concentrate 1, the portions were individually homogenized and 60-ml aliquots, from the 100-ml portion, was diluted with 330-ml of tap water. This is equivalent to the prescribed 5.5:1 by volume dilution of the concentrates determined during qualification of the formulation by the U.S. Forest Service per their Specification 5100-304c.

The second storage sample of each 800-ml Concentrate was removed from storage and immediately homogenized by mixing at 2100-rpm with a propeller stirrer for 5-minutes. After being homogenized, the second storage sample was divided into 8-aliquots in the same manner as that of the first storage sample. Following retrieval, 60-ml of these eight aliquots were mixed with 330-ml of tap water using a 2-inch propeller blade for 5-minutes at 2100-rpm. This resulted in 16-samples representing portions of each Concentrate after 7-days of static storage; 8 of each Concentrate were removed prior to reconstitution and eight representing portions of a previously homogenized solution.

Figure 2:
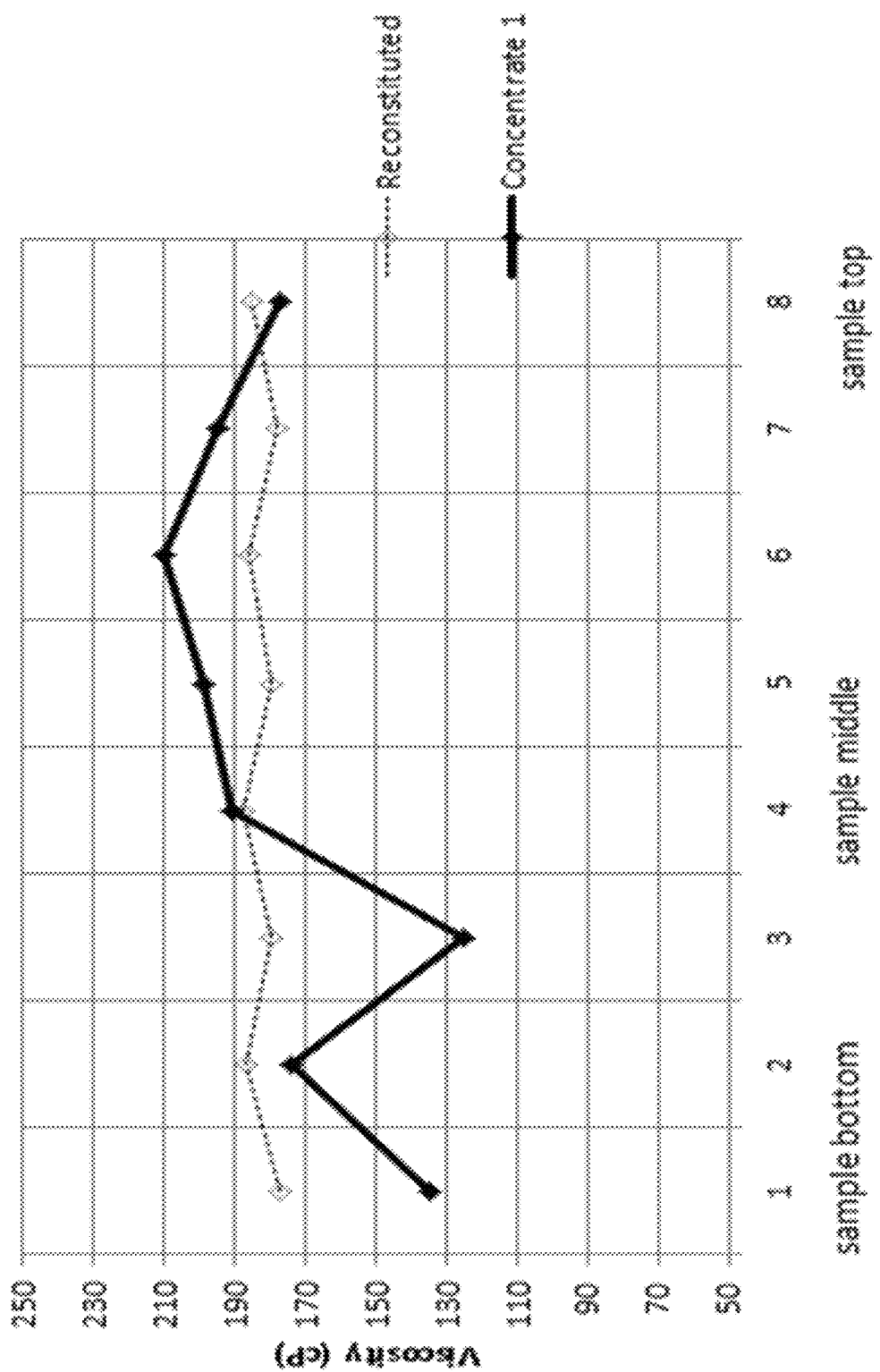
FIG. 2 shows the viscosity variability within Concentrate 1 after 7 days of storage.

FIG. 2 illustrates the variability of the solution viscosity within the 800-ml sample of Concentrate 1 after 7-days of static storage at 120° F./49° C. It is assumed that variability in solution viscosity is directly proportional to the variability of the biopolymer content of each portion of the complete sample. These data show that Concentrate 1 had separated into aliquots ranging in viscosity from 125 to 210 cP prior to reconstitution. The second set of data in FIG. 2 illustrates the viscosity and variability that exists after the Concentrate was re-homogenized, i.e., viscosity varied from 178 to 188 cPs which is probably well within the reproducibility of the viscometer used. Scrutiny of the data shows that the bottom half of the solution contains less thickener than it should and it appears to be floating upward within the solution. This is consistent with the visual observations in Example 1.

Figure 3:
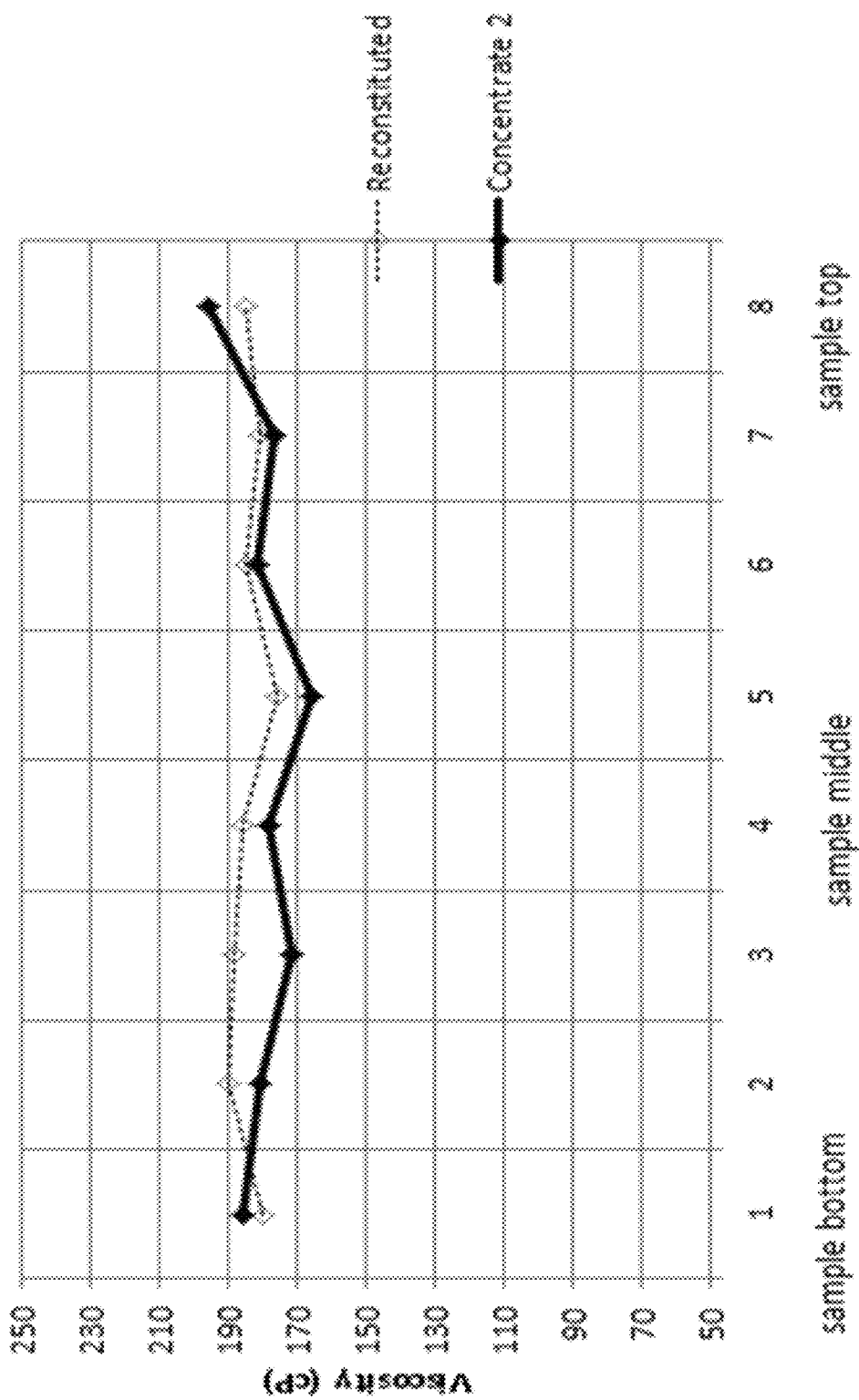
FIG. 3 shows the viscosity variability within Concentrate 2 after 7 days of storage.

Two 800-ml samples of Concentrate 2 were stored and sampled in the same manner as described for Concentrate 1. FIG. 3 illustrates the viscosity variability experienced when Concentrate 2 was stored for 7 days under the same conditions as Concentrate 1. The Concentrate was then treated in the same homogenizing and sampling manner as Concentrate 1. The viscosity was measured as described above for Concentrate 1. The results of this study are illustrated in FIG. 3.

The data illustrated in FIG. 3 shows that the viscosity of Concentrate 2 after 7-days of static storage at 120° F./49° C. was essentially identical to the viscosity of the reconstituted sample showing that no change (separating, settling or deteriorating) in the thickening component had occurred during 7-days of static storage. One can speculate that if the thickener remains suspended homogeneously within the solution, then the other insoluble components will be as well.

Example 4

Particulate Dispersion within the Fire Retardant Concentrate:

The thickener, fugitive color pigment, opacifier and many of the corrosion inhibitors are insoluble in the liquid phase of the long-term liquid fire retardant concentrate. It is desirous to maintain a homogeneous mix of the two phases during storage. Thus, it is possible to illustrate stability of the concentrate during storage by determining the turbidity of fractional samples taken from a stored mass. To demonstrate this, an 800-ml sample of each, Concentrate 1 and Concentrate 2, were prepared and stored under static conditions for 7-days and handled as described in paragraphs 2 and 3 of Example 3. The eight aliquots of each Concentrate were then inverted twenty times to re-suspend any potential sediment at the bottom of the container. Then 0.7812-ml of each aliquot was transferred to a 50-ml polypropylene centrifuge tube using a 1-ml Eppendorf pipette and diluted with DI water to 50-ml (1:64 dilution). The diluted sample was then mixed well by inverting and shaking and then transferred to a turbidity-measuring vial. The turbidity of each sample was determined with a HACH 2100AN Nephelometric Turbidity Units (NTU) meter with all settings in default. The results are illustrated in Table 5 and FIG. 4.

TABLE 5

Turbidity of Cross-sectional Samples of Concentrates 1 and 2

| Aliquot | | Concentrate 1 | Concentrate 2 |
|---|---|---|---|
| bottom | 1 | 1207 | 1491 |
| | 2 | 1334 | 1343 |
| | 3 | 739 | 1303 |
| middle | 4 | 734 | 1435 |
| | 5 | 1680 | 1594 |
| | 6 | 1690 | 1523 |
| | 7 | 1755 | 1534 |
| top | 8 | 1820 | 1593 |

These data illustrate that after 7-days of static storage at a temperature of 120° F./49° C. Concentrate 2 is more uniform, in terms of turbidity caused by suspended solids, than Concentrate 1. The standard deviation of the NTU turbidity units for Concentrate 2 is 109 or 7.4% of the average level of turbidity whereas Concentrate 1 exhibits a standard deviation of 444 or 32.4% of the average NTU value. This standard deviation is a measure of the scatter of particles within the one-eighth gradient samples.

Figure 4:
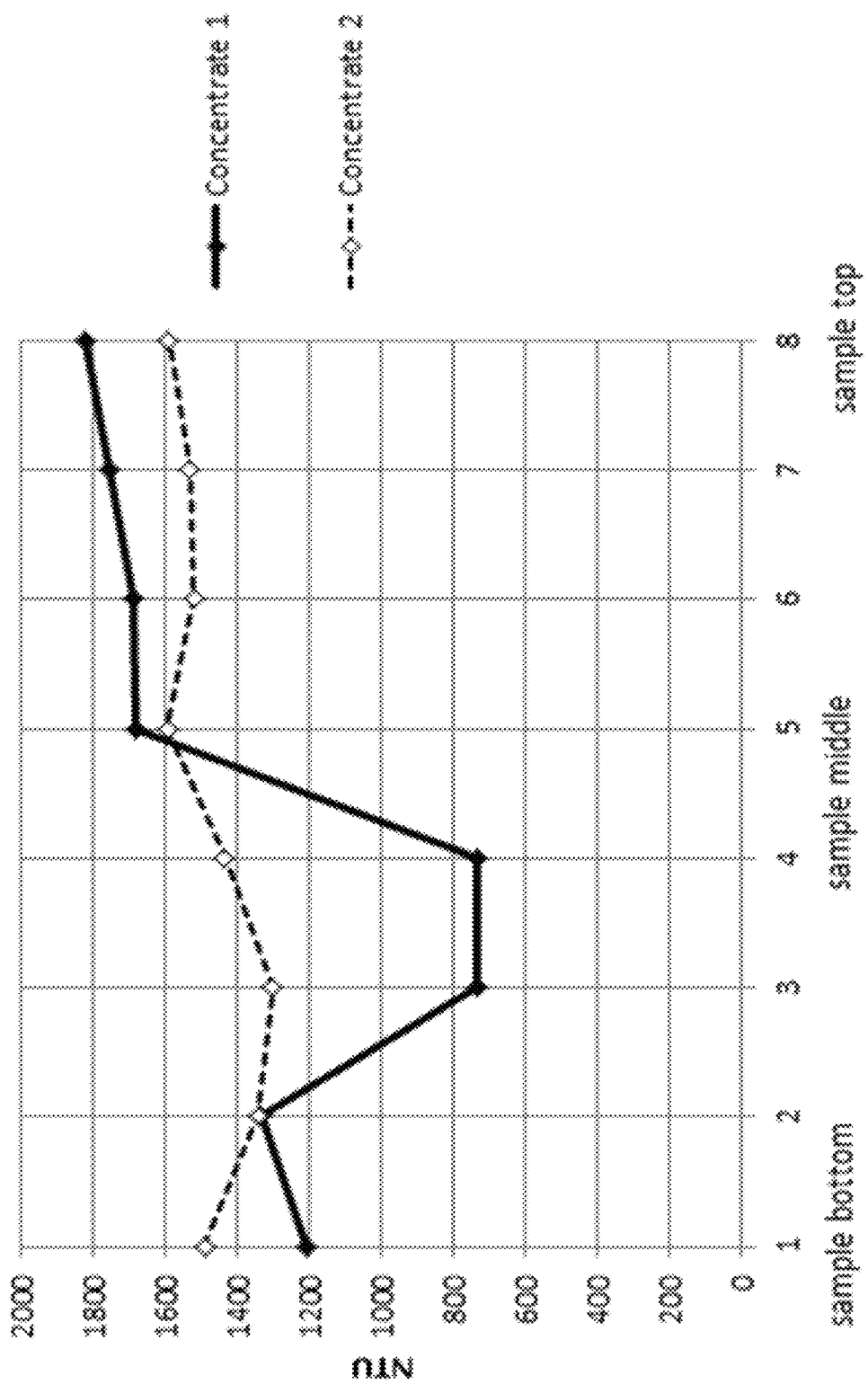
FIG. 4 shows the stability of Concentrates 1 and 2, after 7 days of storage as measured by turbidity method.

Scrutiny of FIG. 4 shows that Concentrate 1 is separating with suspended particulate matter rising within the liquid phase from the lower middle of the sample column toward the top where visual observation (see Example 1) reported that a matte of material formed on the surface of the solution. These data do not indicate that sediment separated to the bottom of the container in this first week of storage.

In a second study, Concentrates 1 and 2 were stored for 14-days prior to sampling and testing as described in the previous paragraph. The data collected from this study revealed that the particulates present in Concentrate 1 continued to rise toward the surface during the second week of storage; rising from the center of the column of Concentrate toward the surface with the increase of particulate appearing as a thicker matte at the surface. There was, also, an indication of some settling to the bottom of the container/tank as well. This indicates that there is a particulate heavy layer at the bottom of the tank, a second layer representing approximately 35% of the total that contains less than the required quantity of insolubles with a heavy matte of particulate floating in the top. Meanwhile Concentrate 2 continued to exhibit little change with all of the particulates within an NTU range of 1000 to 1400.

Figure 5:
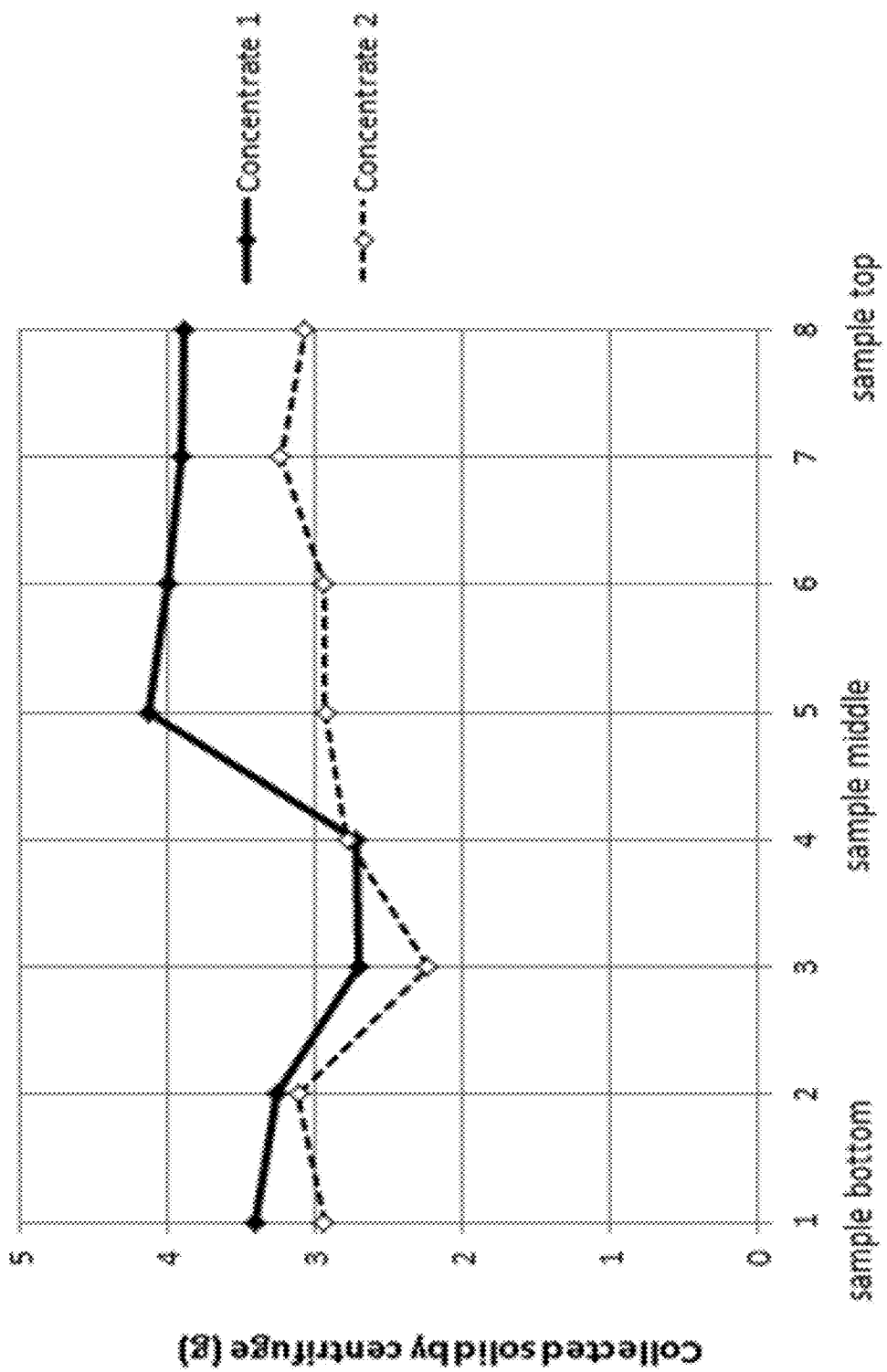
FIG. 5 shows the stability of Concentrates 1 and 2, after 7 days of storage as measured by gravimetric method.

The dispersion of particulate material within the liquid phase of the two Concentrates following static storage was also determined gravimetrically. This data further confirms the information gleaned from the visual, viscosity and turbidity measurements. In this case eight cross-sectional aliquots were removed from 800-ml samples that had been stored as described above. These aliquots were inverted twenty times to re-suspend any potential sediment. Then 15-grams of each aliquot of the two Concentrates was transferred to pre-labeled and pre-weighed centrifuge tubes and centrifuged at 16,000-rpm for 30-minutes. The supernatant was then carefully decanted and the tubes inverted on a thick stack of absorbent paper toweling for 2-hours to completely remove any remaining liquid. The tubes containing the particulates were then placed within a chemical hood and allowed to air-dry overnight. The centrifuge tubes containing the particulates were then weighed and the net weight of particulates in each of the tubes calculated. FIG. 5 illustrates the weight of particulates present in each of the aliquots.

Separate 800-ml samples were prepared and stored under static conditions for 14-days before the eight aliquots were withdrawn in the same manner as described above for the 7-day storage period. These aliquots were inverted to re-suspend sediment, transferred to pre-weighed and labeled centrifuge tubes, centrifuged at 16,000-rpm for 30-minutes, supernatant decanted, dried and weighed. The weight of particulates in each aliquot is illustrated in FIG. 6.

Figure 6:
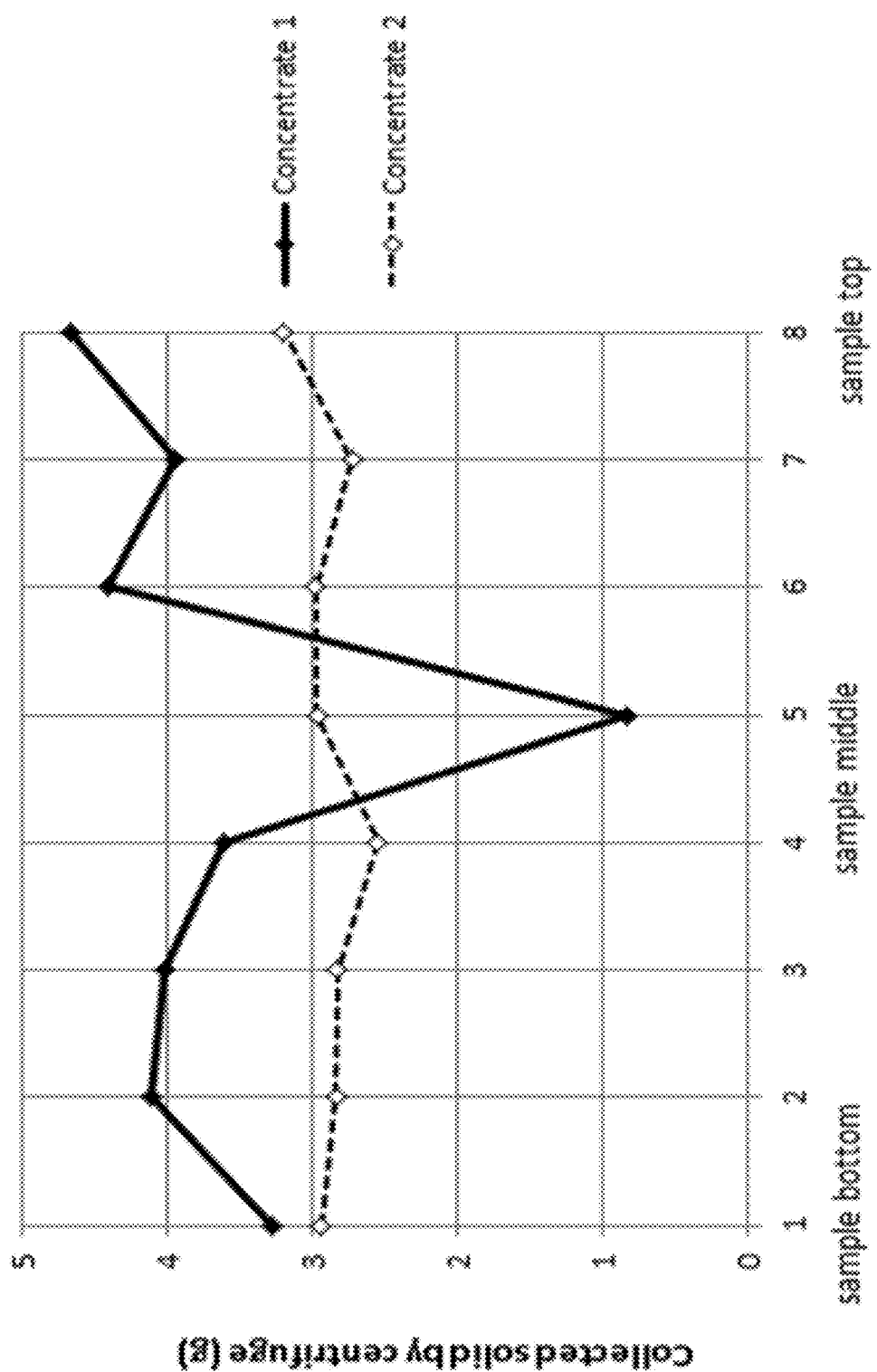
FIG. 6 shows the stability of Concentrates 1 and 2, after 14 days of storage as measured by gravimetric method.

Comparison of FIG. 5 and FIG. 6 indicates that the rate of separation of Concentrate 1, which contains the non-fluorescent, hydrophobic fugitive pigment, is accelerating, i.e., the amount of separation that occurred between 7-days and 14-days is considerably greater than that which occurred during the first 7-days of storage. The curves also indicate that separation within Concentrate 1 is proceeding via particulate settling and moving toward the upper surface of the liquid column. Meanwhile, Concentrate 2, containing the hydrophilic fugitive pigment, remains stable.

Example 5

Storage Stability of Long-Term Fire Retardant Solution.

As described previously, long-term fire retardants composed of ammonium phosphate solutions rather than dry powders are stored as an aqueous liquid concentrate that is mixed with water at the time of use. The aqueous liquid concentrates consist of particulate ingredients suspended homogeneously within a liquid phase. Previous examples described the stability of these liquid fire retardant concentrates during static storage awaiting dilution at the time of use. When the call for help is received, the liquid fire retardant Concentrate is diluted with potable water. The liquid fire retardant Concentrates described in Table 2 were qualified for use when 1 part by volume of the Concentrate is diluted with 5.5 parts by volume water to form an approximately 20% by weight solution of the concentrate.

The storage stability of fire retardant solutions prepared by admixing 1-part by volume of Concentrates 1 and 2 with 5.5 parts by volume of potable water and storing them at 70° F./21° C. for several months on a laboratory bench is illustrated in the photographs in FIG. 7. These bottles of diluted solution were not prepared for laboratory study and were consequently not monitored during storage. They have, in fact, been shaken on an unknown number of occasions to illustrate the consistency of the two solutions. Neither bottle was, however, disturbed for several days prior to the time this picture was taken. The solution containing diluted Concentrate 1, consisting of a non-fluorescent, hydrophobic fugitive pigment, is on the left while the solution of the right was prepared with Concentrate 2 containing the fugitive pigment and iron oxide opacifier. The composition of both Concentrates can be found in Table 2.

Example 6

U.S. Pat. No. 5,439,968 provides for a low plate-out fluorescent pigment concentrate comprising: (a) a pigment comprising a polyamide and a fluorescent dye and (b) a carboxylated polyolefin consisting essentially of polyethylene or polypropylene having a molecular weight of about 1,000 to about 100,000, the polyolefin containing pendant acid or anhydride residue groups in the amount of about 0.25% to about 10% by weight based on the weight of the polyolefin, and the polyolefin being present in sufficient amount to disperse the pigment. The polyamide or modified polyamide which is used in the fluorescent pigment can be any of the conventional thermoplastic polymers having a melting point of 60°-200° C. Polyamides are well known in the art, and are the reaction products of dicarboxylic acids or amino acids and diamines. Typical dicarboxylic acids are those having 6 to 12 carbon atoms. Typical diamines are those having 6 to 12 carbon atoms. The acid or diamine can be substituted with conventional substituents such as, for example, alkyl from one to 12 carbons. Typical polyamides include nylon 6, nylon 66, nylon 610 and nylon 11. "Polyamide" is intended to include such substituted polyamides. The polymeramide can have a molecular weight of 500 to 100,000. Conventional, well-known processes are used in preparing the polyamides.

The fluorescent pigment can be present in an amount of about 5 to about 50 wt %, e.g., about 20 to about 40 wt %, based upon the total weight of the concentrate. They must also be sufficiently heat stable. Combinations of two or more fluorescent pigments can be used.

Fluorescent pigments are also referred to as daylight fluorescent colors. Daylight fluorescent colors with few exceptions are really not true pigments but are instead solid solutions of fluorescent dyes in transparent synthetic resins which are finely ground to a particle size in the range of 2 to 5 microns.

The fluorescent pigments can be said to be fluorescent dyes in molecular solution in the carrier resin. Examples of fluorescent dyes useful in preparing the fluorescent pigments are the fluorescent brighteners containing sulfo groups, in particular stilbene fluorescent brighteners, especially those of the type of the bis-triazinylaminostilbenedisulfonic acids, the bis-styrylbiphenyls, the bis-styrylbenzenes and the bis-triazolylstilbenedisulfonic acids. The fluorescent brighteners containing sulfonic acid groups can be in the form of their metal salts, for example, lithium, potassium, magnesium or sodium salts, and also ammonium, amine or alkanolamine salts. Fluorescent brightener compounds which have been partially acidified or fluorescent brighteners in the form of the free acid can be used. Any of the fluorescent brighteners containing sulfo groups of U.S. Pat. No. 4,466,900 can be used, which is incorporated herein by reference in its entirety.

Other examples of fluorescent dyes which can be used to prepare the fluorescent pigments are the fluorescent naphthalimide dyes for example, Morton Fluorescent Yellow G (Color Index 75), Fluorol 7GA (Color Index-Fluorescent brightening agent 75), Calcofluor Yellow (Color Index-Fluorescent brightening agent No. 4) and Azosol Brilliant Yellow 6 GF (Color Index-Solvent Yellow 44), and the fluorescent cuomarin dyes, for example, Calcofluor White RW (Color Index fluorescent brightening agent 68) and Blancophor White AW (Color Index-Fluorescent brightening agent 68). Other useful fluorescent dyes include Rhodanine B, Rhodanine 6 GDN, Auramine, Eosine G, Calcofluor White ST, Pontamine White RT, Pontamine White BTS, Rhodamine Bx, Phthalocyamine, Alkali Blue G, Phthalocyamine, Rhoamine 7G, Rhodamine FB, Rhodamine S, Rhodamine 5G, Bright Yellow 3G, Tetramethyl Rhodamine, Rhodamine FG, Rhodamine F4G, Fanal Pink D, Fanal Violet D, Flexo Yellow 110, Lumogen Yellow D, Fluorol Green Gold, Fluorol Yellow and Thermoplast F-Orange.

Certain representative examples of fluorescent pigments are those based on polyamides from Day-Glo Color Company.

The fluorescent pigments can be prepared with the aid of dyeing assistants.

In contrast to normal pigments, the fastness to light of fluorescent pigments is only moderate. This is a result of the poor light fastness of the fluorescent colorants they contain; the carrier resins themselves being very stable to light. The addition of UV stabilizers, e.g., benzophenone and benzotriazole classes, gives marked improvements. Such products are frequently already present in the fluorescent pigments.

Many of the commercially available fluorescent pigments recommended for plastics are heat-stable only up to moderate temperatures because of the limited thermal stability of the carrier resins. These temperatures for short dwell times range between 180° C. and 230° C. according to the type of carrier resin and its degree of 60 cross-linking. Processing temperatures in such range suffice for the final plastic products where they are molded at a temperature of up to 425° F., e.g., 400° F. (about 205° C.) or less.

The fluorescent pigments must not be subjected to too high of shear in the dry blending operation as it may adversely affect the color characteristics of the fluorescent pigments.

Useful homo or copolymers of α-olefins include low molecular weight polyethylene, crystalline polypropylene, amorphous polypropylene, mixtures of crystalline and amorphous polypropylene, poly-1-butene, and propylene copolymers with one or more higher α-olefins. Useful higher α-olefins include 1-butene, 1-pentene, 1-hexene, 1-heptene, 1-octene, 1-decene, and 4-methyl-1-pentene.

The α-olefins are reacted using conventional techniques with at least one unsaturated acid or anhydride having 3 to 5 carbon atoms or a 1-10 carbon atom ester thereof. Representative acids, anhydride, or esters include maleic anhydride, dimethyl maleate, acrylic acid, methacrylic acid, and crotonic acid.

Certain polyolefins containing pendant acid or anhydride residue groups are polyethylene and polypropylene containing pendant maleic anhydride residue groups.

A process for preparing the low plate-out fluorescent pigment concentrate involves: (I) dry blending the pigment and polyolefin, for example using high intensity mixing conditions, but not subjecting the pigment particle surfaces to such high shear so as to materially affect the color characteristics of the pigment particles; and (II) melt mixing the dry blended mixture at a temperature of 425° F. or lower and optionally forming the melt mixed material into a form useful for fabrication. In certain aspects the forming of the melt-mixed material involves the steps of: (a) forming the melt-mixed materials into strands; (b) cooling the strands; and (c) pelletizing the strands. The temperature during extrusion should not exceed 425° F.

In formulating the concentrate the ingredients are for example in powder form and are in dry form. The fluorescent pigment concentrates are dispersed in polymers in order to form molded articles containing fluorescent pigments. Any conventional dispersion or incorporation means, such as, a mixer, can be used. The dispersions of polymer and fluorescent pigment concentrate are molded, using any conventional molder, into molded articles.

Generally, sufficient concentrate should be used to provide a concentration of from about 0.10 to about 2 wt % (based on the total weight of the final plastic product) of fluorescent pigment in the final plastic product.

The compositions used to form the final polymer products can contain the usual additives, such as, heat and/or light stabilizers. Some material which act as lubricants can adversely affect the plate-out characteristics.

Example Basis Formulation

| | |
|---|---|
| Polyolefin Resin | 0-46% |
| Fluorescent Pigment | 35% |
| Filler (equal to or less than two microns average particle size) | 10% |
| TiO$_2$ | 2% |
| Silcron G-100 | 2% |
| Wax Dispersant | 5-51% |

Note:
Inorganic material like barium sulfate or various clays.

Mixing Procedure
1. Weigh-out ingredients into high-intensity mixer
2. Mix on medium speed for 1 minute
3. Discharge material Extrusion Procedure:
1. Set temperatures no higher than 425° F.
2. Extrude into strands
3. Run strands through water bath to cool
4. Run cooled strands through a pelletizer Plate-Out Test:
1. Place 5.0 g of concentrate onto polished press plates
2. Put plates into press set at no more than 375° F.
3. Apply enough pressure to get a press-out of about 20 mils
4. Remove plates and cool in water bath
5. Remove pressed material and visually evaluate residue deposited onto plate
6. Rating system:
   (a) Excellent (no plate-out)
   (b) Good (very little plate-out)
   (c) Moderate plate-out
   (d) Bad plate-out
   (e) Very bad plate-out The concentrates rating as OK in this work are rated no higher than a two. A rating of 3 is marginal, and ratings of 4 and 5 are considered to be unacceptable. All others are considered to have too much plate-out.

The present disclosure is not to be limited in scope by the specific aspects described or preceding Examples which are intended as single illustrations of individual aspects of the disclosure, and any compositions or methods which are functionally equivalent are within the scope of this disclosure. Indeed, various modifications of the disclosure in addition to those shown and described herein will become apparent to those skilled in the art from the foregoing description and accompanying drawings. Such modifications are intended to fall within the scope of the appended claims.

All publications and patent applications mentioned in this specification are herein incorporated by reference to the same extent as if each individual publication or patent application was specifically and individually indicated to be incorporated by reference.

APPENDIX A

| Royale Pigments & Chemicals Magenta 108 PB | | |
|---|---|---|
| Chemical name | Common name and synonyms | CAS # |
| COMPOSITION | | |
| Isophorone diamine | 3-Aminomethyl-3,5,5-trimethyl Cyclohexylamine IPD | 2855-13-2 |
| Petroleum resins | | 64742-16-1 |
| 1,3-Benzenedicarboxylic acid | Isophthalic acid | 121-91-5 |
| Benzoic acid | Benzenecarboxylic acid | 65-85-0 |
| 1,3,5-Triazine-2,4,6-triamine | Melamine | 108-78-1 |
| Isobutanolamine | 2-Amino-2-methyl-1-propanol | 124-68-5 |
| Calcium carbonate | Aragonite Calcium monocarbonate | 471-34-1 |
| Polyphosphoric acids, ammonium salts | Ammonium polyphosphate | 68333-79-9 |
| Xanthylium, 3,6-bis(ethylamino)-9-[2-(methoxycarbonyl)phenyl]-2,7-dimethyl-, chloride | CI Basic Red 1:1 | 3068-39-1 |
| Xanthylium,3,6-bis(diethylamino)-9-[2-(methoxycarbonyl)phenyl]-, (T-4)-tetrachlorozincate(2-) (2:1) | CI Basic Violet 11:1 | 73398-89-7 |
| 2-Naphthalenol, 1-[(2-methoxyphenyl)azo]- | CI Solvent Red 1 | 1229-55-6 |
| PHYSICAL AND CHEMICAL PROPERTIES | | |
| pH | 6.5-7.5 | |
| Melting/Freezing Point | 165-175° C. | |
| Bulk Density (gms/cc) | 0.25-0.35 | |
| Particle size in Microns (Wet method - by Malvern Mastersizer 3000) | D 50 | 3-4 |
| | D 90 | 8-10 |
| | D 100 | 14-18 |

What is claimed is:

1. A liquid fire-retardant concentrate, the concentrate comprising a liquid fire-retardant component and an insoluble phase comprising a fugitive color system, the fugitive color system comprising a fugitive pigment and a water insoluble opaque material, wherein:

the fugitive pigment is formaldehyde-free and comprises a fluorescent dye encapsulated within a polymeric material and is characterized by a surface free energy of at least about 45 and a polar component value of at least about 20; and the liquid fire-retardant concentrate exhibits a substantially constant storage stability for at least 7 days.

2. The liquid fire-retardant concentrate of claim 1 wherein the substantially constant storage stability is exhibited under static storage conditions and at a temperature of up to 120° F./49° C.

3. The liquid fire-retardant concentrate of claim 1 wherein the substantially constant stability is indicated by an increase in Nephelometric Turbidibity Units (NTU) of no more than about 25%, for a plurality of diluted concentrate samples tested after storage for 7 days.

4. The liquid fire-retardant concentrate of claim 1 wherein the substantially constant storage stability of the concentrate is indicated by a standard deviation of Nephelometric Turbidibity Units (NTU) of less than about 25%, for a plurality of diluted concentrate samples tested after storage for 7 days.

5. The liquid fire-retardant concentrate of claim 1 wherein the liquid fire-retardant concentrate exhibits a substantially constant storage stability for 14 days.

6. The liquid fire-retardant concentrate of claim 5 wherein the substantially constant stability is indicated by an increase in Nephelometric Turbidibity Units (NTU) of no more than about 25%, for a plurality of diluted concentrate samples tested after storage for 14 days.

7. The liquid fire-retardant concentrate of claim 5 wherein the substantially constant storage stability of the concentrate is indicated by a standard deviation of Nephelometric Turbidibity Units (NTU) of less than about 25%, for a plurality of diluted concentrate samples tested after storage for 14 days.

8. The liquid fire-retardant concentrate of claim 1 wherein the fugitive pigment is fluorescent.

9. The liquid fire-retardant concentrate of claim 1 wherein the liquid fire-retardant component is selected from the group consisting of an ammonium phosphate solution, an ammonium sulfate solution, an ammonium thiosulfate solution, and mixtures thereof.

10. The liquid fire-retardant concentrate of claim 9 wherein the liquid fire-retardant component is an ammonium phosphate solution.

11. The liquid fire-retardant concentrate of claim 9 wherein the liquid fire-retardant component is a 10-34-0 agricultural fertilizer solution.

12. The liquid fire-retardant concentrate of claim 9 wherein the liquid fire-retardant component is an 11-37-0 agricultural fertilizer solution.

13. The liquid fire-retardant concentrate of claim 9 wherein the liquid fire-retardant component comprises a mixture of monoammonium phosphate (MAP) and diammonium phosphate (DAP).

14. The liquid fire-retardant concentrate of claim 1 wherein the concentrate further comprises one or more components selected from the group consisting of a suspending clay, a corrosion inhibiting agent, a biopolymer, and mixtures thereof.

15. A fire-retardant solution, the fire-retardant solution comprising the liquid fire-retardant concentrate of claim 1 and water.

16. A method for preparing a fire-retardant solution, the method comprising diluting the liquid fire-retardant concentrate of claim 1 with water.

* * * * *